(12) United States Patent
Han et al.

(10) Patent No.: US 8,067,709 B2
(45) Date of Patent: Nov. 29, 2011

(54) HAPTIC STEERING WHEEL SWITCH DEVICE AND HAPTIC STEERING WHEEL SWITCH SYSTEM INCLUDING THE SAME

(75) Inventors: Chang Kyu Han, Seoul (KR); Hyun Yong Lee, Gyeonggi-do (KR)

(73) Assignee: Daesung Electric Co., Ltd, Ansan-Si, Gyeonggi-Do (KR)

( * ) Notice: Subject to any disclaimer, the term of this patent is extended or adjusted under 35 U.S.C. 154(b) by 63 days.

(21) Appl. No.: 12/680,198

(22) PCT Filed: May 26, 2009

(86) PCT No.: PCT/KR2009/002772
§ 371 (c)(1),
(2), (4) Date: Mar. 25, 2010

(87) PCT Pub. No.: WO2009/145543
PCT Pub. Date: Dec. 3, 2009

(65) Prior Publication Data
US 2010/0200375 A1    Aug. 12, 2010

(30) Foreign Application Priority Data

May 26, 2008 (KR) .................. 10-2008-0048744
Jun. 10, 2008 (KR) .................. 10-2008-0054198

(51) Int. Cl.
*H01H 3/08* (2006.01)
(52) U.S. Cl. ......................................... 200/336
(58) Field of Classification Search ............. 200/336, 200/61.54, 61.55, 4, 5 R, 14, 17 R, 18, 1 B, 200/339, 61.56, 61.57, 553; 341/35; 345/184; 280/731

See application file for complete search history.

(56) References Cited

U.S. PATENT DOCUMENTS

| 5,855,144 A * | 1/1999 | Parada ........................... 74/552 |
| 6,852,936 B2 * | 2/2005 | Hayashi et al. ............ 200/61.54 |
| 7,439,459 B2 * | 10/2008 | Hyun et al. ................... 200/5 R |
| 7,441,800 B2 * | 10/2008 | Weber et al. .................. 280/731 |

FOREIGN PATENT DOCUMENTS

| KR | 1997-0040790 | 7/1997 |
| KR | 2007-0026259 A | 3/2007 |
| WO | WO-2006-013470 A2 | 2/2006 |

* cited by examiner

*Primary Examiner* — Edwin A. Leon
(74) *Attorney, Agent, or Firm* — Rabin & Berdo, PC

(57) ABSTRACT

The present invention provides a haptic steering wheel switch device and a haptic steering wheel switch system including the same. The haptic steering wheel switch device comprises: a housing mounted in a steering wheel; a printed circuit board disposed inside of the housing; and a haptic rotary switch unit including a haptic rotary switch driver disposed in the housing and adapted to generate a rotational force in response to an electrical signal, a haptic rotary switching power transfer unit adapted to transfer the rotational force generated from the haptic rotary switch driver, and a haptic rotary switch knob exposed outside of the housing and connected to the haptic rotary switching power transfer unit to receive the rotational force from the haptic rotary switching power transfer unit.

21 Claims, 10 Drawing Sheets

[Fig. 1]
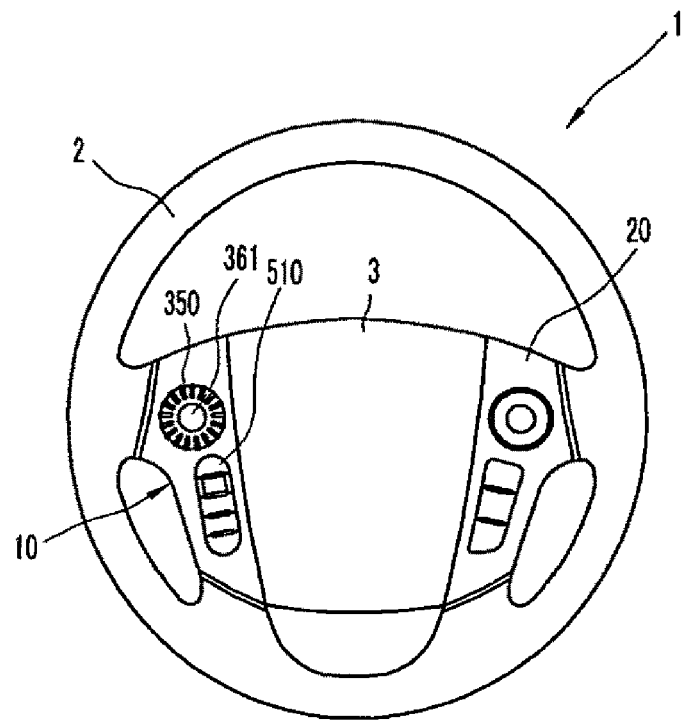
[Fig. 2]
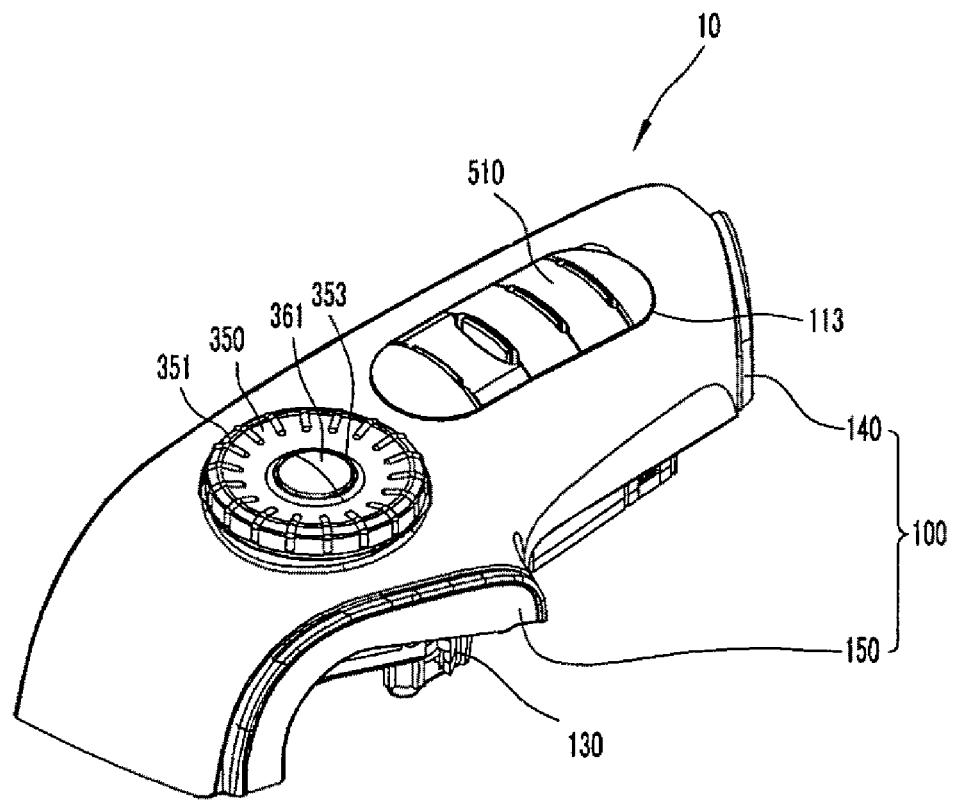

[Fig. 3]
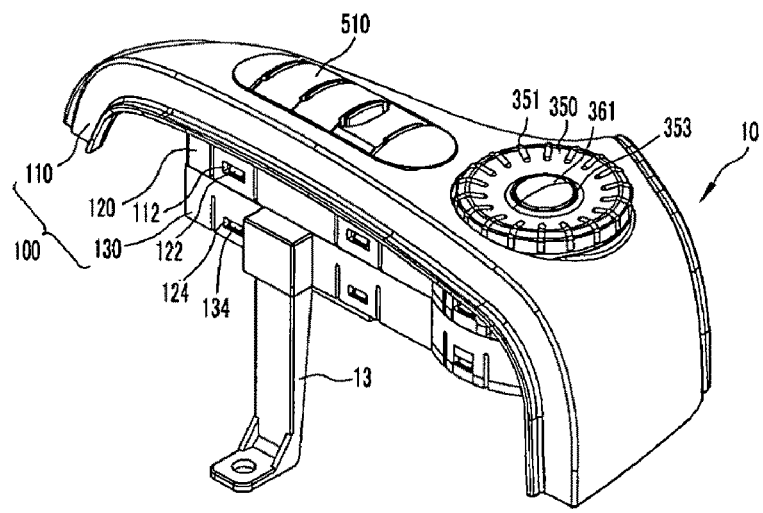
[Fig. 4]
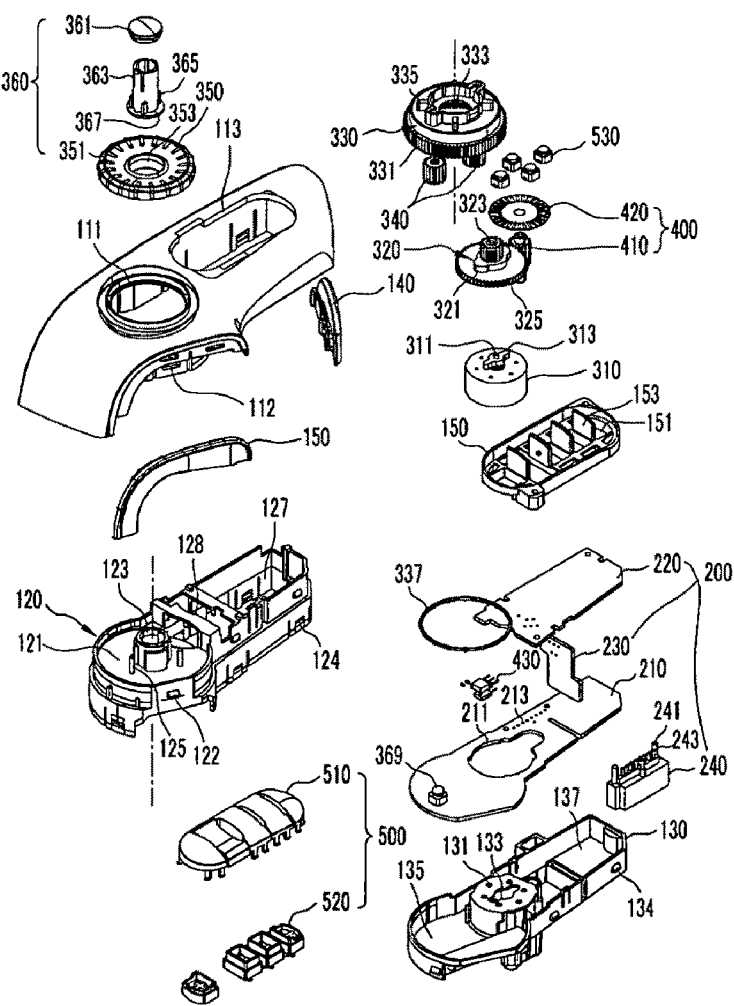

[Fig. 5]
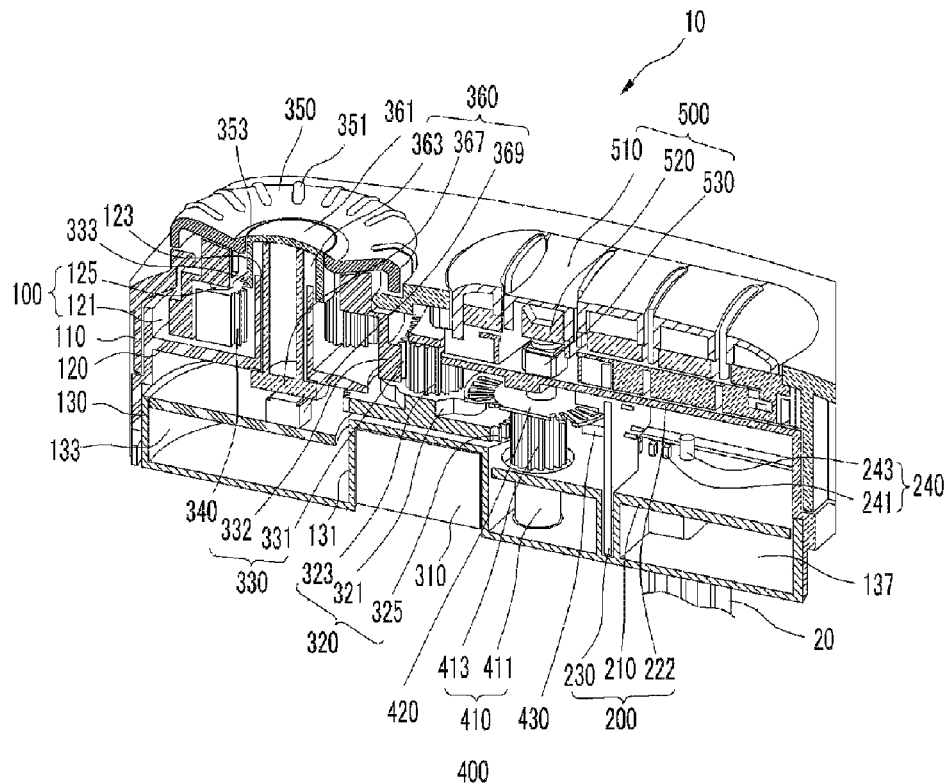
[Fig. 6]
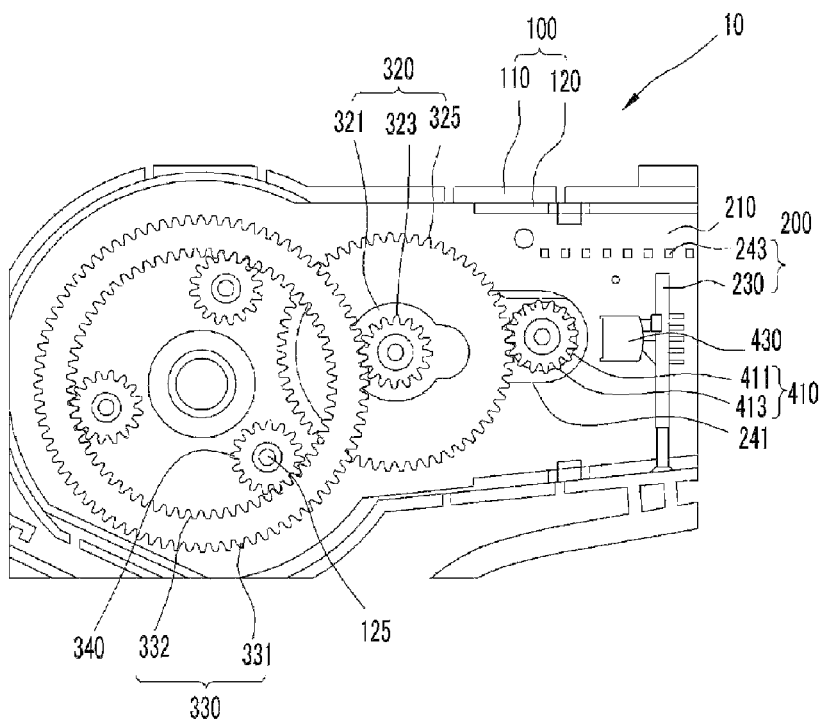

[Fig. 7]
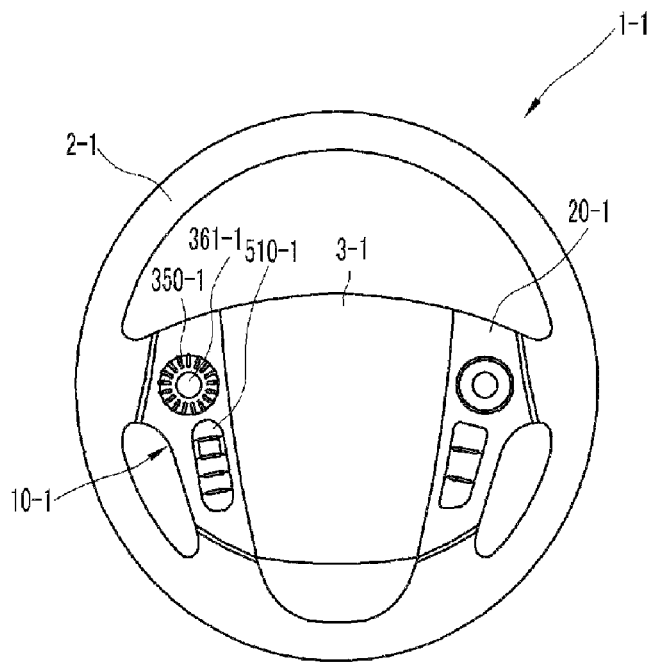
[Fig. 8]
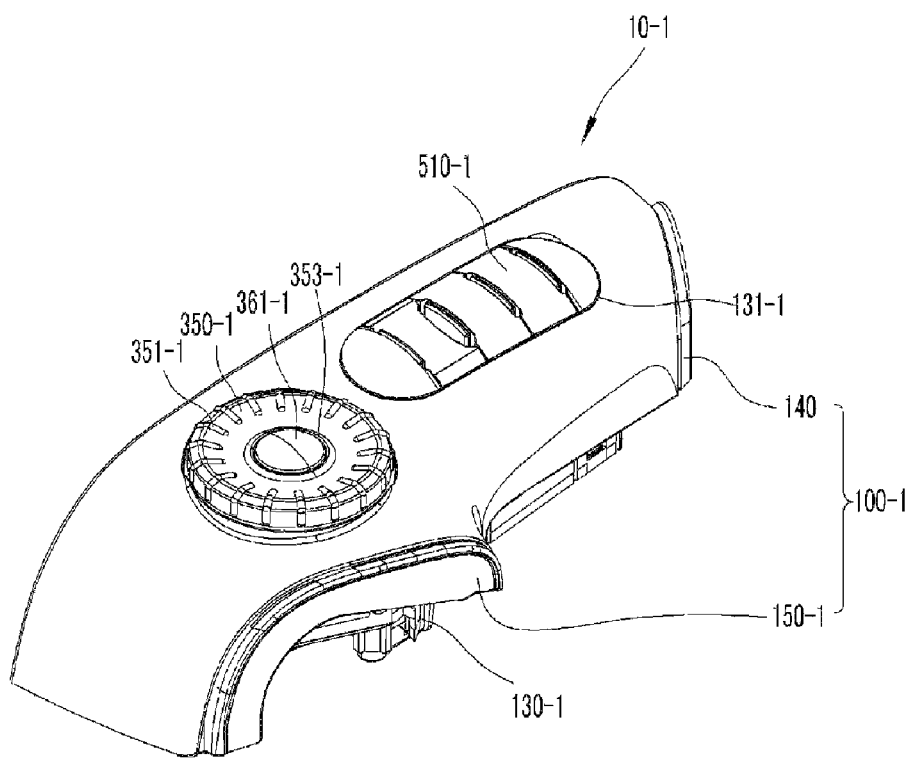

【Fig. 9】
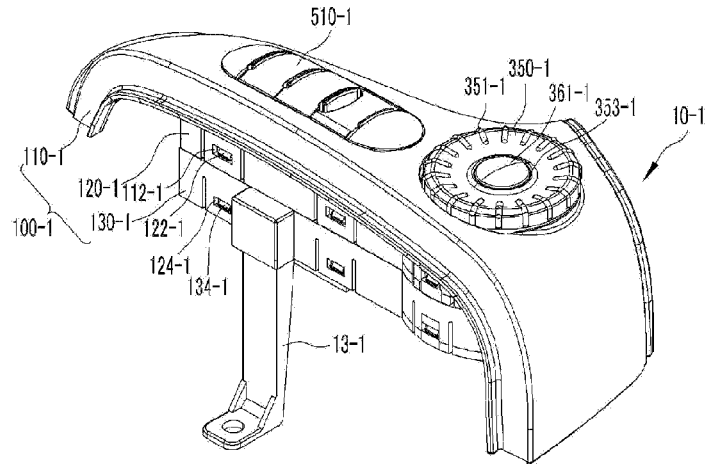
【Fig. 10】
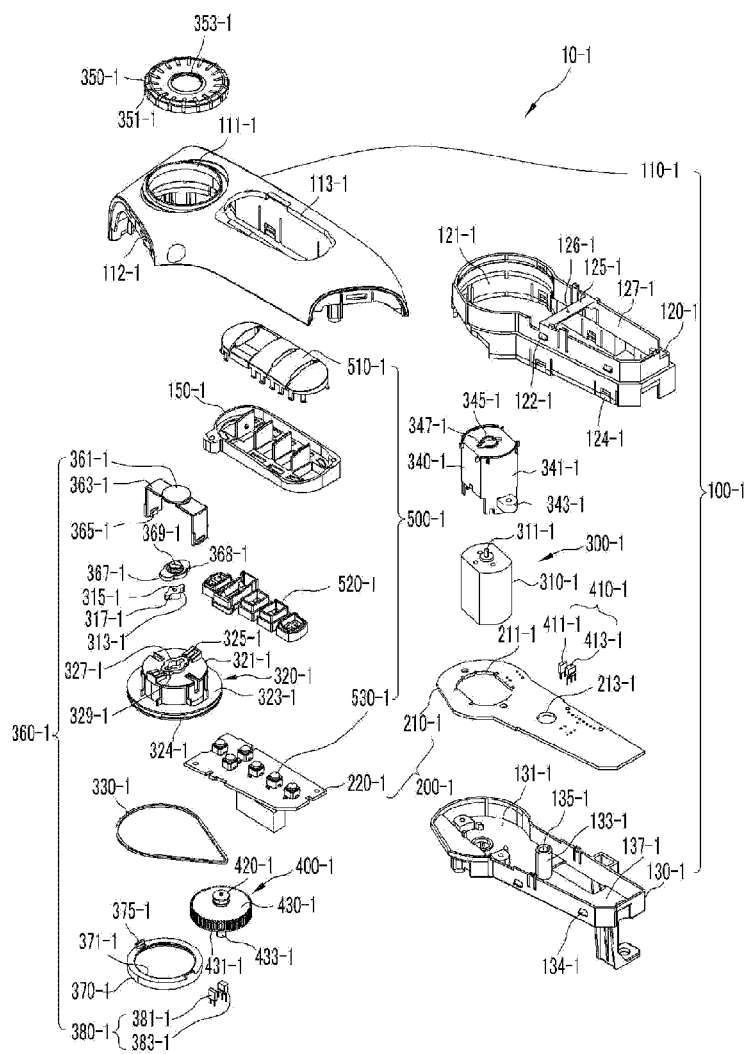

[Fig. 11]
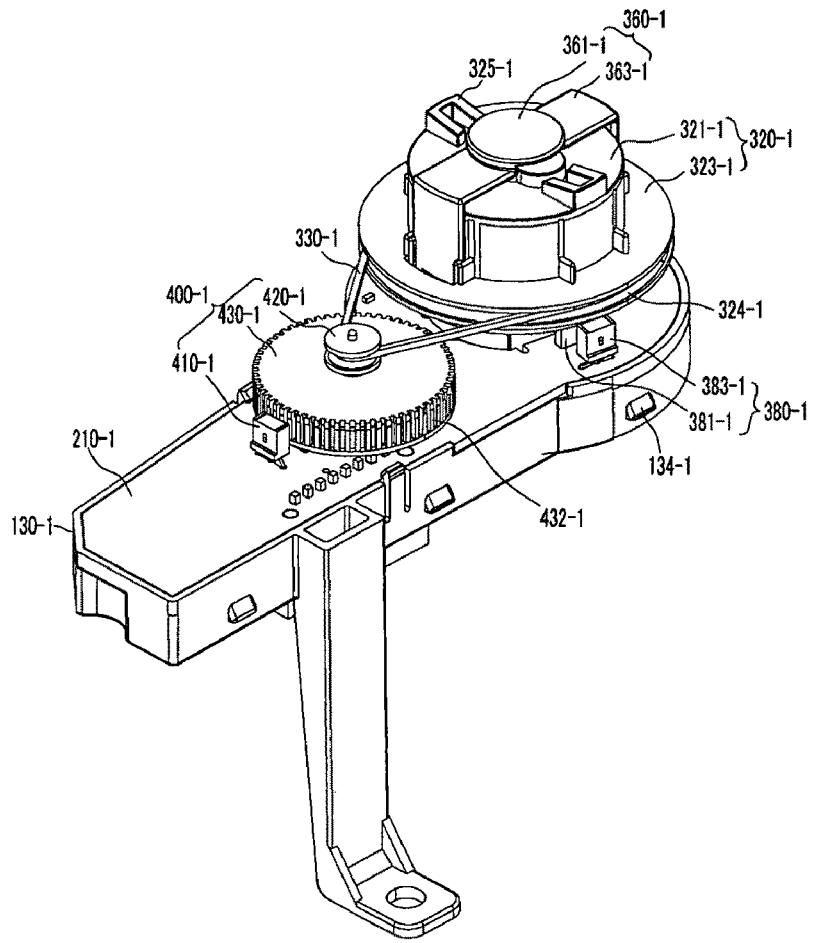
[Fig. 12]
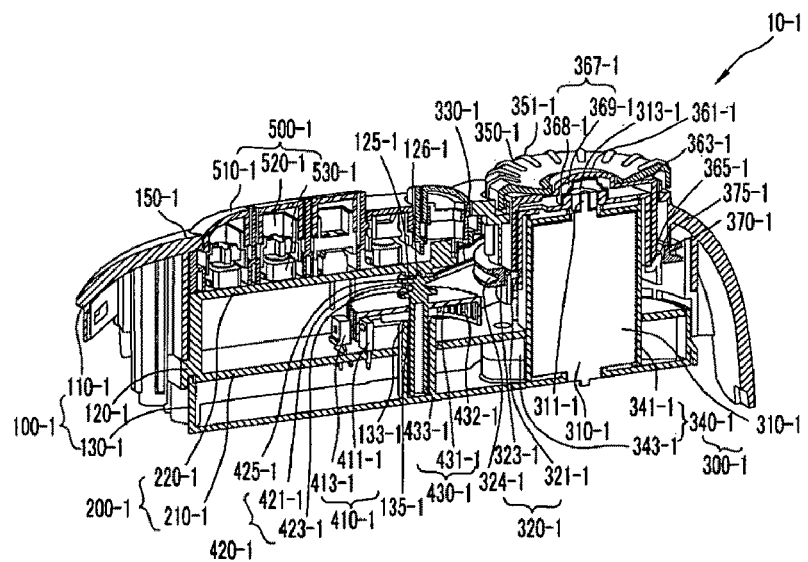

[Fig. 13]
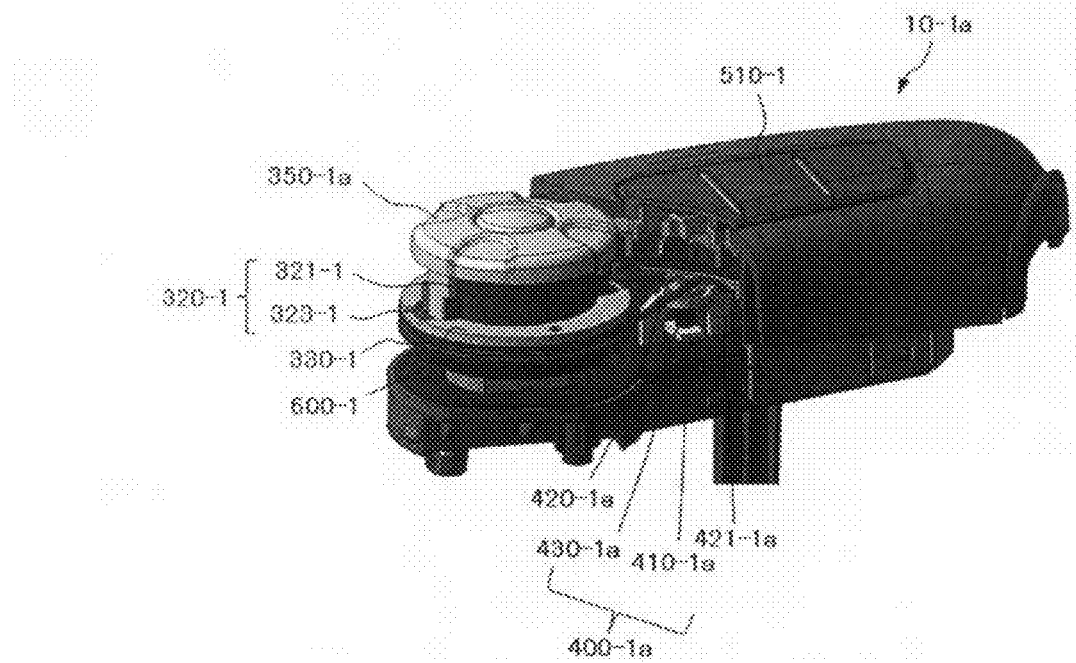
[Fig. 14]
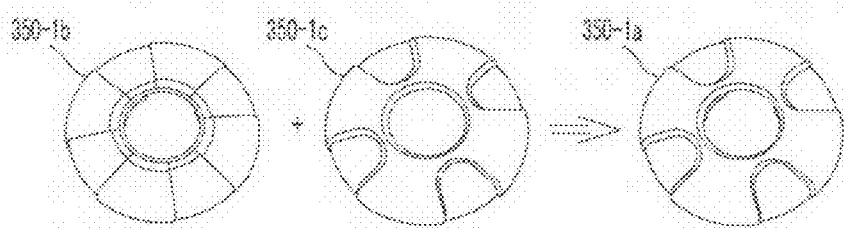
[Fig. 15]
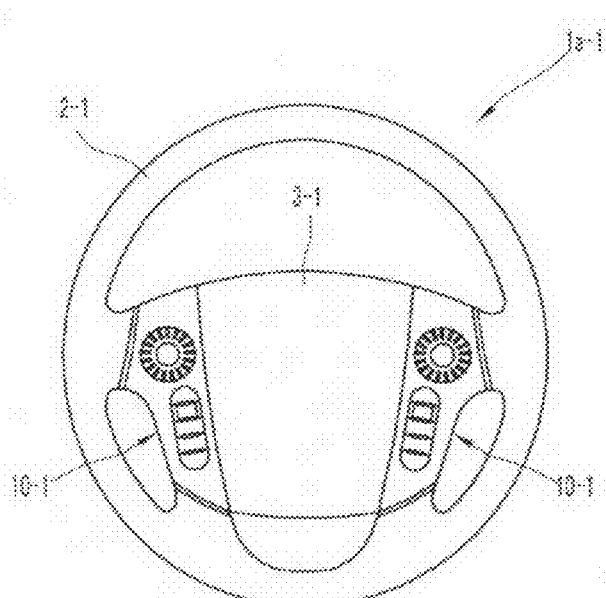

[Fig. 16]
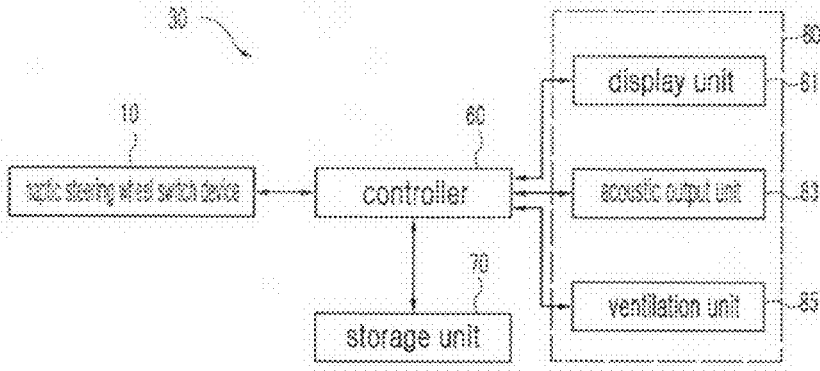
[Fig. 17]
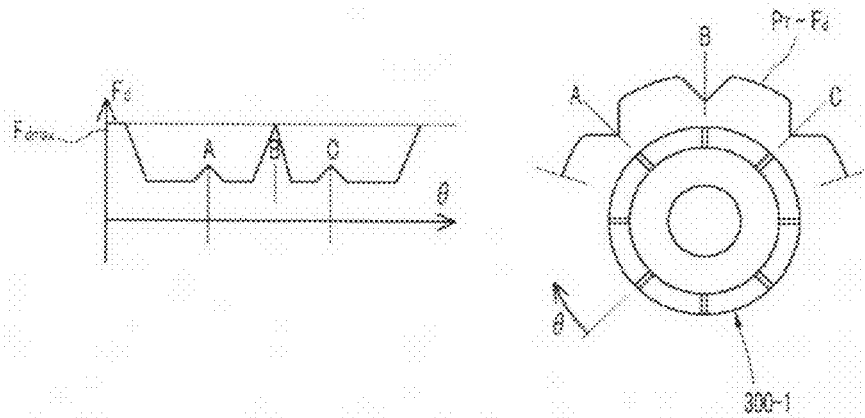
[Fig. 18]
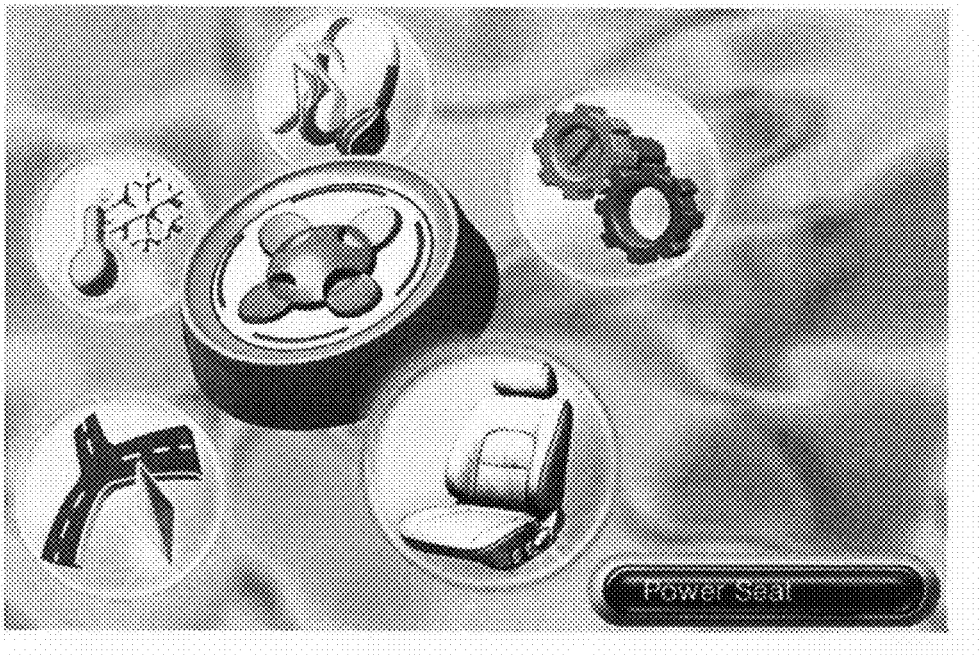

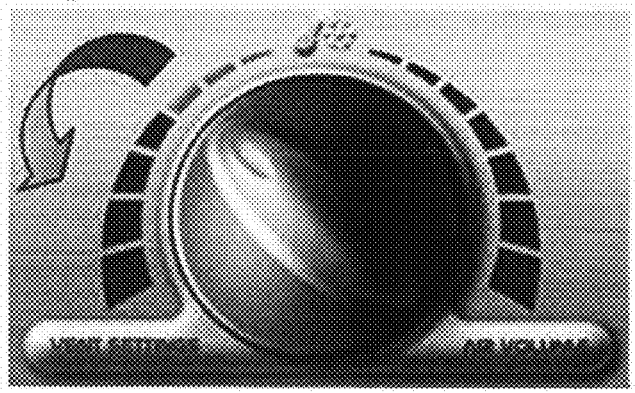
[Fig. 19]
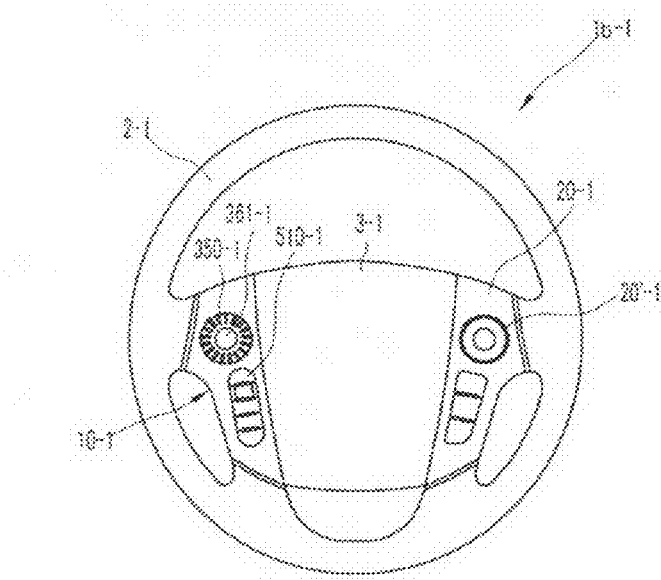
[Fig. 20]
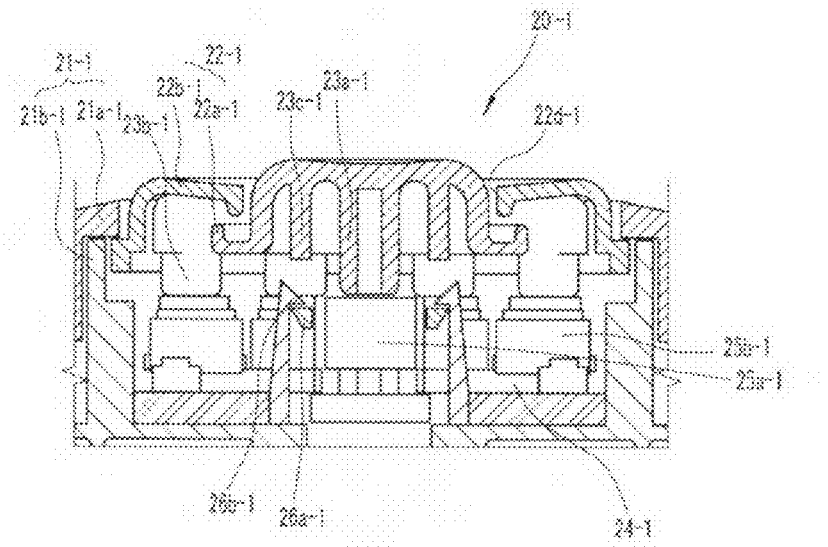
[Fig. 21]

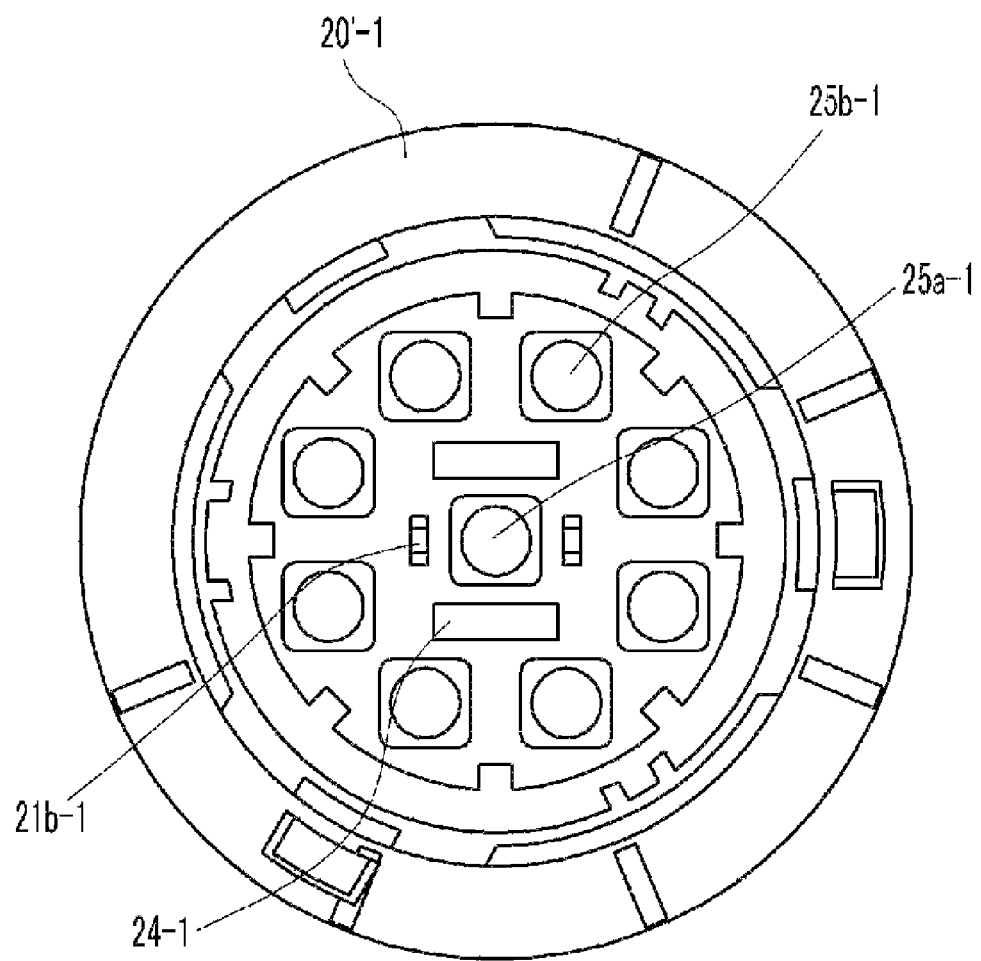
[Fig. 22]

HAPTIC STEERING WHEEL SWITCH DEVICE AND HAPTIC STEERING WHEEL SWITCH SYSTEM INCLUDING THE SAME

TECHNICAL FIELD

The present invention relates to a haptic steering wheel switch device and a system including the same, and more particularly, to a haptic steering wheel switch device which allows a user to feel both vibration and resistance against rotation thereof so as to enable rapid manipulation thereof without any dispersion and distraction of his or her attention during the driving of a vehicle, and a haptic steering wheel switch system including the same.

BACKGROUND ART

Haptics is a field of research which enables information to be transferred to a user based on sense of touch or tactile sensation. The transfer of information has been mostly performed through the sense of sight (or the visible sensation) and the sense of hearing (or auditory sensation). But the researches on the haptics are in rapid progress due to an increase in the needs of a user for another sensory information along with the development of a computer interface of a virtual environment The application range of a typical haptic device is abruptly extended to cellular phones and the like beyond simulators. Meanwhile, a motor vehicle is additionally equipped with a variety of accessories enabling a comfortable driving environment for a driver or occupants in the motor vehicle. Such accessories provide convenience in driving to the driver or occupants, and simultaneously involve a serious problem in that the driver's driving concentration is reduced to obstruct the safety driving. For this reason, various switch devices are intensively mounted on a steering wheel of the motor vehicle. However, as the number of convenience equipments mounted at the vehicle is increased, the number of switches mounted on the steering wheel is also increased, resulting in an ironic situation where a driver divert his or her attention onto the steering wheel of the vehicle so as to manipulate the switches. Therefore, there is a need for a switch having a structure which can secure both integration of the switches and safety driving of a vehicle as well as enables rapid manipulation and sensory recognition of whether or not the switches are manipulated.

DISCLOSURE

Technical Problem

Accordingly, the present invention has been made in view of the above-mentioned problems associated with the prior art, and it is an object of the present invention to provide a haptic steering wheel switch device which is constructed to allow a user to feel a tactile sensation through both vibration and resistance against rotation, thereby improving durability and facilitation of manipulation thereof, and a system steering wheel switch system including the same.

Technical Solution

To accomplish the above object, according to one exemplary embodiment of the present invention, there is provided a haptic steering wheel switch device including: a housing mounted in a steering wheel; a printed circuit board disposed inside of the housing; and a haptic rotary switch unit including a haptic rotary switch driver disposed in the housing and adapted to generate a rotational force in response to an electrical signal, a haptic rotary switching power transfer unit adapted to transfer the rotational force generated from the haptic rotary switch driver, and a haptic rotary switch knob exposed outside of the housing and connected to the haptic rotary switching power transfer unit to receive the rotational force from the haptic rotary switching power transfer unit.

In the haptic steering wheel switch device, the haptic rotary switching power transfer unit may includes: a haptic rotary switch driving gear connected to the haptic rotary switch driver; and a haptic rotary switch knob gear rotatably disposed in the housing in such a fashion as to be meshed with the haptic rotary switch driving gear so as to be rotated together with the haptic rotary switch knob. Also, the haptic rotary switching power transfer unit further may include a haptic rotary switch planetary gear rotatably mounted to the housing, and wherein the outer circumference of the haptic rotary switch driving gear may abut against that of the haptic rotary switch knob gear in such a fashion that the outer circumference of the haptic rotary switch planetary gear partially abuts against the inner circumference of the haptic rotary switch knob gear.

In the haptic steering wheel switch device, the haptic rotary switch unit may further include a haptic enter switch unit which includes: a haptic enter switch knob movably disposed at the haptic rotary switch knob; a haptic enter switch shaft disposed to penetrate through the haptic rotary switching power transfer unit and connected to the haptic enter switch knob; and a haptic enter switch disposed on one surface of the printed circuit board and adapted to be movable by the haptic enter switch shaft.

In the haptic steering wheel switch device, the haptic rotary switching power transfer unit may include a haptic rotary switch driving gear connected to the haptic rotary switch driver. The haptic steering wheel switch device may include a haptic rotary switch sensing unit, wherein the haptic rotary switch sensing unit comprises: a rotary shaft rotatably disposed to mesh with the haptic rotary switch driving gear; a haptic rotary switch sensor counterpart mounted on the rotary shaft of the haptic rotary switch sensing unit so as to be rotated together with the rotary shaft; and a haptic rotary switch sensor disposed on the printed circuit board so as to be placed at a position corresponding to the haptic rotary switch sensor counterpart.

In the haptic steering wheel switch device, the haptic steering wheel switch device may further include a haptic button switch unit disposed in the housing.

In addition, the haptic steering wheel switch device may further include a directional switch unit which includes: a directional switch knob movably disposed at the steering wheel; a directional switch printed circuit board disposed to correspond to the directional switch knob; and a plurality of directional switches disposed on one surface of the directional switch printed circuit board to correspond to the directional switch knob, and adapted to be moved by means of the directional switch knob.

To accomplish the above object, according to another exemplary embodiment of the present invention, there is provided a haptic steering wheel switch system including: a haptic steering wheel switch device, wherein the haptic steering wheel switch device comprises: a housing mounted in a steering wheel; a printed circuit board disposed inside of the housing; and a haptic rotary switch unit including a haptic rotary switch driver disposed in the housing and adapted to generate a rotational force in response to an electrical signal, a haptic rotary switching power transfer unit adapted to transfer the rotational force generated from the haptic rotary switch driver, and a haptic rotary switch knob exposed outside of the housing and connected to the haptic rotary switching power transfer unit to receive the rotational force from the haptic rotary switching power transfer unit; a controller connected to the haptic steering wheel switch device so as to allow electrical communication to be established between the controller and the haptic steering wheel switch device, and adapted to output a control signal to the haptic steering wheel switch device; a storage unit connected to the controller so as to allow electrical communication to be established between the storage unit and the controller, and adapted to store a preset operating mode corresponding to an electrical signal outputted from the haptic steering wheel switch device; and an operating unit connected to the controller so as to allow electrical communication to be established between the operating unit and the controller, and adapted to be operated to correspond to an operating mode preset in response to an electrical signal outputted from the controller. In haptic steering wheel switch system, the operating unit may further include a display unit or an acoustic output unit connected to the controller so as to allow electrical communication to be established between the display unit or the acoustic output unit and the controller, and adapted to be operated in response to the control signal generated from the controller.

To accomplish the above object, according to still another exemplary embodiment of the present invention, there is provided a haptic steering wheel switch device including: a housing mounted in a steering wheel; a printed circuit board disposed inside of the housing; a haptic rotary switch unit including a haptic rotary switch driver disposed in the housing and adapted to generate a rotational force in response to an electrical signal, and a haptic rotary switch knob adapted to receive the rotational force generated from the haptic rotary switch driver; a haptic rotary transfer unit connected at one side to the haptic rotary switch knob, and connected at the other side to the haptic rotary switch driver so as to interconnect the haptic rotary switch knob and the haptic rotary switch driver; and a haptic rotary switch sensing unit including a haptic rotary switch sensor disposed on the printed circuit board, and a haptic rotary switch sensor counterpart rotatably disposed at a position corresponding to the haptic rotary switch sensor and adapted to receive the rotational force from the haptic rotary switch driver, whereby the haptic rotary transfer unit is connected at one side to the haptic rotary switch driver and is connected at the other side to haptic rotary switch sensor counterpart so as to transfer the rotational force from the generated from the haptic rotary switch driver to the haptic rotary switch sensor counterpart.

In the haptic steering wheel switch device, the haptic rotary transfer unit may further include: a haptic rotary transfer knob adapted to be rotated together with the haptic rotary switch driver, the haptic rotary transfer knob being connected to the haptic rotary switch driver and having a transfer knob pulley; a counterpart pulley formed at one end of the haptic rotary switch sensor counterpart; and a transfer belt engaged at both sides with the transfer knob pulley and the counterpart pulley, respectively.

In the haptic steering wheel switch device, the haptic rotary switch sensor counterpart may include a plurality of slits formed on the circumferential surface thereof, and the haptic rotary switch sensor may include an optical sensor.

In the haptic steering wheel switch device, the haptic rotary switch unit may further include a haptic enter switch unit, wherein the haptic enter switch unit includes: a haptic enter switch knob movably disposed at one end at the haptic rotary switch knob in such a fashion as to be exposed to the outside and movably disposed at the other end at the haptic rotary transfer knob in such a fashion as to penetrate through the haptic rotary transfer knob; and a haptic enter switch disposed at a position corresponding to the other end of the haptic enter switch knob on the printed circuit board so as to be operated by the other end of the haptic enter switch knob.

In the haptic steering wheel switch device, the haptic steering wheel switch device may further include a haptic button switch unit disposed in the housing.

In the haptic steering wheel switch device, the haptic steering wheel switch device may further include a directional switch unit, wherein the directional switch unit includes: a directional switch knob movably disposed at the steering wheel; a directional switch printed circuit board disposed to correspond to the directional switch knob; and a plurality of directional switches disposed on one surface of the directional switch printed circuit board to correspond to the directional switch knob, and adapted to be moved by means of the directional switch knob.

In the haptic steering wheel switch device, the haptic rotary switch knob may include a dual injection-molded structure.

In the haptic steering wheel switch device, the haptic rotary transfer unit further comprises a transfer knob weight disposed under the haptic rotary switch knob.

In the haptic steering wheel switch device, the haptic rotary switch sensor counterpart may include a magnet, and haptic rotary switch sensor may include a magnetic sensor disposed on the printed circuit board in such a fashion as to be spaced apart from the haptic rotary switch sensor counterpart.

To accomplish the above object, according to yet another exemplary embodiment of the present invention, there is provided a haptic steering wheel switch system including: a haptic steering wheel switch device, wherein the haptic steering wheel switch device includes: a housing mounted in a steering wheel; a printed circuit board disposed inside of the housing; and a haptic rotary switch unit including a haptic rotary switch driver disposed in the housing and adapted to generate a rotational force in response to an electrical signal, and a haptic rotary switch knob adapted to receive the rotational force generated from the haptic rotary switch driver; a haptic rotary transfer unit connected at one side to the haptic rotary switch knob, and connected at the other side to the haptic rotary switch driver so as to interconnect the haptic rotary switch knob and the haptic rotary switch driver; and a haptic rotary switch sensing unit including a haptic rotary switch sensor disposed on the printed circuit board, and a haptic rotary switch sensor counterpart rotatably disposed at a position corresponding to the haptic rotary switch sensor and adapted to receive the rotational force from the haptic rotary switch driver, whereby the haptic rotary transfer unit is connected at one side to the haptic rotary switch driver and is connected at the other side to haptic rotary switch sensor counterpart so as to transfer the rotational force from the generated from the haptic rotary switch driver to the haptic rotary switch sensor counterpart; a controller connected to the haptic steering wheel switch device so as to allow electrical communication to be established between the controller and the haptic steering wheel switch device, and adapted to output a control signal to the haptic steering wheel switch device; a storage unit connected to the controller so as to allow electrical communication to be established between the storage unit and the controller, and adapted to store a preset operating mode corresponding to an electrical signal outputted from the haptic steering wheel switch device; and an operating unit connected to the controller so as to allow electrical communication to be established between the operating unit and the controller, and adapted to be operated to correspond to an operating mode preset in response to an electrical signal outputted from the controller. In the haptic steering wheel switch system, the operating unit may further includes a display unit or an acoustic output unit connected to the controller so as to allow electrical communication to be established between the display unit or the acoustic output unit and the controller, and adapted to be operated in response to the control signal generated from the controller.

To accomplish the above object, according to a further exemplary embodiment of the present invention, there is provided a haptic steering wheel switch device including: a housing mounted in a steering wheel; a printed circuit board disposed inside of the housing; and a haptic rotary switch unit including a haptic rotary switch driver disposed in the housing and adapted to generate a rotational force in response to an electrical signal, and a haptic rotary switch knob exposed outside of the housing and adapted to receive the rotational force generated from the haptic rotary switch driver.

Advantageous Effects

The haptic steering wheel switch device and the haptic steering wheel switch system including the same according to the present invention as constructed above has a variety of following advantageous effects.

First, the haptic steering wheel switch device and the haptic steering wheel switch system including the same according to the present invention can provide a haptic sensation to allow a driver to have sensory recognition by a tactile sensation or the like, thereby preventing induction of dispersion and distraction of his or her attention during driving, and hence ensuring the safety driving.

Second, the haptic steering wheel switch device and the haptic steering wheel switch system including the same according to the present invention include the haptic rotary switch unit mounted at the steering wheel of a vehicle so as to allow a driver to achieve more rapid and stable switch manipulation.

Third, the haptic steering wheel switch device and the haptic steering wheel switch system including the same according to the present invention include a rotational force transfer structure of a gear engagement type so as to achieve secure power transfer for a manipulation force or a manipulation reaction force, thereby remarkably reducing a possibility of erroneous operation.

Fourth, the haptic steering wheel switch device and the haptic steering wheel switch system including the same according to the present invention include a rotational force transfer structure of a gear engagement type, thereby maximizing the resolving power of the haptic rotary switch sensing unit at low cost.

Fifth, the haptic steering wheel switch device and the haptic steering wheel switch system including the same according to the present invention realize a structure in which the haptic rotary switch unit is directly associated with the haptic rotary switch driver so as to achieve secure power transfer for a manipulation force or a manipulation reaction force, thereby remarkably reducing a possibility of erroneous operation.

Sixth, the haptic steering wheel switch device and the haptic steering wheel switch system including the same according to the present invention include a constituent element having a rotational force transfer structure of a pulley-belt engagement type, thereby maximizing the resolving power of the haptic rotary switch sensing unit so that the haptic rotary switch sensing unit can perform an accurate reactive operation through more smooth and accurate sense at lower cost.

While the present invention has been described in connection with the exemplary embodiments illustrated in the drawings, they are merely illustrative embodiments and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should be defined by the technical spirit of the appended claims.

DESCRIPTION OF DRAWINGS

FIG. 1 is a schematic top plan view illustrating a steering wheel mounted with a haptic steering wheel switch device according to one embodiment of the present invention;

FIG. 2 is a schematic perspective view illustrating a haptic steering wheel switch device according to one embodiment of the present invention;

FIG. 3 is a schematic perspective view illustrating the haptic steering wheel switch device of FIG. 2 when viewed from another direction;

FIG. 4 is a schematic exploded perspective view illustrating a haptic steering wheel switch device according to one embodiment of the present invention;

FIG. 5 is a schematic partially perspective vertical sectional view illustrating a haptic steering wheel switch device according to one embodiment of the present invention;

FIG. 6 is a schematic partially transverse sectional plan view illustrating a gear meshing structure of a haptic steering wheel switch device according to one embodiment of the present invention;

FIG. 7 is a schematic top plan view illustrating a steering wheel mounted with a haptic steering wheel switch device according to another embodiment of the present invention;

FIG. 8 is a schematic perspective view illustrating a haptic steering wheel switch device according to another embodiment of the present invention;

FIG. 9 is a schematic perspective view illustrating the haptic steering wheel switch device of FIG. 2 when viewed from another direction;

FIG. 10 is a schematic exploded perspective view illustrating a haptic steering wheel switch device according to another embodiment of the present invention;

FIG. 11 is a schematic partially assembled perspective view illustrating a haptic steering wheel switch device according to another embodiment of the present invention;

FIG. 12 is a schematic partially perspective vertical sectional view illustrating a haptic steering wheel switch device according to another embodiment of the present invention;

FIG. 13 is a schematic partially broken perspective view illustrating another example of a haptic steering wheel switch device according to another embodiment of the present invention;

FIG. 14 is a top plan view illustrating a schematic manufacturing process of a haptic rotary switch knob of a haptic steering wheel switch device according to another embodiment of the present invention;

FIG. 15 is a schematic top plan view illustrating a steering wheel mounted with a haptic steering wheel switch device according to yet another embodiment of the present invention;

FIG. 16 is a schematic block diagram illustrating the construction of a haptic steering wheel switch system according to the present invention;

FIG. 17 is a schematic diagrammatic view illustrating a haptic sensation imparted to a haptic rotary switch knob of haptic steering wheel switch system according to the present invention;

FIG. 18 is a schematic view illustrating a state where images are displayed on a display unit in one example of a user interface for haptic steering wheel switch system according to the present invention;

FIG. 19 is a schematic view illustrating a state where images are displayed on a display unit in a user interface for the adjustment of a ventilation unit for a haptic steering wheel switch system according to the present invention;

FIG. 20 is a schematic top plan view illustrating a steering wheel mounted with a haptic steering wheel switch device according to still another embodiment of the present invention;

FIG. 21 is a schematic partially vertical sectional view illustrating a directional switch unit of a haptic steering wheel switch device FIG. 20; and FIG. 22 is a schematic partially top plan view illustrating a directional switch unit of a haptic steering wheel switch device FIG. 20.

MODE FOR INVENTION

Now, a haptic steering wheel switch device and a haptic steering wheel switch system including the same according to the present invention will be described hereinafter in more detail with reference to the accompanying drawings.

FIG. 1 is a schematic top plan view illustrating a steering wheel mounted with a haptic steering wheel switch device 10 according to one embodiment of the present invention, FIG. 2 is a schematic perspective view illustrating a haptic steering wheel switch device 10 according to one embodiment of the present invention, FIG. 3 is a schematic perspective view illustrating the haptic steering wheel switch device 10 of FIG. 2 when viewed from another direction, FIG. 4 is a schematic exploded perspective view illustrating a haptic steering wheel switch device 10 according to one embodiment of the present invention, and FIG. 5 is a schematic partially perspective vertical sectional view illustrating a haptic steering wheel switch device 10 according to one embodiment of the present invention. The haptic steering wheel switch device 10 according to one embodiment of the present invention includes a housing 100, a printed circuit board 200 and a haptic rotary switch unit 300. The printed circuit board 200 is disposed inside of the housing 100, and the haptic rotary switch unit 300 is disposed in the housing 100 so as to be rotated by a user. As shown in FIG. 1, the housing 100 is mounted in a steering wheel 1 which includes a steering wheel body 3 and a steering wheel rim 2. Another switch device 20 may be provided at a position opposite to the haptic steering wheel switch device 10 of the steering wheel 1. The housing 100 is disposed at a side of the steering wheel body 3 of the steering wheel 1 in such a fashion as to be positioned between the steering wheel body 3 and the steering wheel rim 2. The housing 100 includes a cover 110, a body 120 and a base 130. The housing body 120 is disposed between the housing cover 110 and the housing base 130.

The housing cover 110 has a through-opening 111 formed on a side of the top surface thereof so as to allow haptic rotary switch knob 350, which will be described later, to be exposed externally therethrough. Also, in the case where the haptic steering wheel switch device 10 further includes a haptic button switch unit 500, the housing cover 110 may have a button switch knob through-opening 113 formed on the top surface thereof so as to allow the haptic button switch knob 510 of the haptic button switch unit 500 to be exposed externally therethrough. The housing cover 110 has cover-to-body engagement slots 112 formed on sides thereof and the housing body 120 has body-to-cover engagement pieces 122 formed on sides thereof to correspond to the cover-to-body engagement slots 112 so that the housing body 120 and the housing cover 110 is engaged with each other by means of the engagement between the cover-to-body engagement slots 112 and the body-to-cover engagement pieces 122.

The housing body 120 takes a construction for stable mounting or support of other constituent elements. The housing body 120 has an enter switch shaft through-passage 123 formed in a side thereof so as to allow a haptic enter switch shaft 363 of a haptic enter switch unit 360, which will be described later, to pass therethrough. The housing body 120 has body-to-base engagement slots 124 formed at the lower ends of sides thereof and the housing base 130 has base-to-body engagement pieces 134 formed on sides thereof to correspond to the body-to-base engagement slots 124. The body-to-base engagement slots 124 and the base-to-body engagement pieces 134 have a mutual engagement structure to enable the engagement between the housing body 120 and the housing base 130.

The housing base 130 includes a driver receiving portion 131 for therein accommodating a haptic rotary switch driver 310 which will be described later. The housing base 130 includes an enter switch mounting portion 135 defining a mounting space of the haptic enter switch unit 360 and a button switch mounting portion 137 defining a mounting space of the haptic button switch unit 500 in the proximity of the driver receiving portion 131. According to the circumstances, the housing 100 may includes a separate housing constituent element so as to partition the inner space thereof and facilitate the mounting of the haptic steering wheel switch device 10. That is, as shown in FIG. 4, the housing 100 may include a housing rear portion 140 and a housing side portion 150 so as to partition the inner space defined by the housing cover 110 and the housing base 130 or prevent a damage of the housing due to the contact between the housing and an external constituent element. The housing rear portion 140 and the housing side portion 150 may be formed of a soft material different from a material of the housing cover and the housing base, and may be constructed in various manners depending on the design specification.

The printed circuit board 200 is disposed inside of the housing 100. The printed circuit board 200 according to one embodiment of the present invention includes a main printed circuit board 210, a button printed circuit board 220 and a sensing printed circuit board 230. The main printed circuit board 210 is disposed in the inner space of the housing defined by the housing body 120 and the housing base 130. A plurality of electrical elements and wiring circuits is disposed on the main printed circuit board 210. The main printed circuit board 210 has a driver receiving portion through-opening 211 formed therein so that the driver receiving portion 131 passes through the driver receiving portion through-opening 211 so as to be oriented toward the inner space of the housing body 120. The main printed circuit board 210 includes a connector mounting portion 213. A connector 240 includes connector mounting lugs 241 and connector pins 243. The connector mounting lugs 241 and the connector pins 243 are fixedly inserted into the connector mounting portion 213. The connector 240 is exposed to the outside through the housing 100 so that it is electrically connected with an external electrical connector (not shown) corresponding to the connector 240 so as to establish electrical communication between the haptic steering wheel switch device and the external device.

The button printed circuit board 220 is disposed between the housing cover 110 and the housing body 120 in such a fashion as to confront a button switch knob through-opening 113 formed in the housing cover 110. The sensing printed circuit board 230 is vertically disposed in a space defined between the main printed circuit board 210 and the button printed circuit board 220. That is, as shown in FIG. 5, the sensing printed circuit board 230 is vertically disposed between the main printed circuit board 210 and the button printed circuit board 220 which are parallel with each other. The housing base 130 may include an accommodating part adapted to receive the sensing printed circuit board 230.

The haptic steering wheel switch device 10 according to one embodiment of the present invention includes a haptic rotary switch unit 300. The haptic rotary switch unit 300 includes a haptic rotary switch driver 310, a haptic rotary switching power transfer unit 320, 330 and 340, and a haptic rotary switch knob 350. The haptic rotary switch driver 310 is disposed in the housing 100, i.e., the housing base 130 and generates a rotational force in response to an electrical signal. The housing base 130 includes the driver receiving portion 131 so that the haptic rotary switch driver 310 is received in the driver receiving portion 131. The driver receiving portion 131 has a through-opening 133 formed on the top surface thereof so that a driving shaft 311 formed on the top surface of the haptic rotary switch driver 310 and an extension portion 313 disposed around the driving shaft 311 pass through the through-opening 133. The extension portion 3131 is rotated integrally together with the driving shaft 311. The extension portion 313 of the haptic rotary switch driver 310 takes a structure in which it is formed radially from a center of the shaft. The extension portion 313 has a structure in which it is meshed with a haptic rotary switch driving gear 320 which will be described later. The haptic rotary switch driver 310 is implemented as an electric motor. The haptic rotary switch driver 310 performs a predetermined operation based on an electrical signal inputted through the connector 240. The haptic rotary switch driver 310 is preferably implemented as a motor enabling forward rotation, reverse rotation and the like.

The haptic rotary switching power transfer unit 320, 330 and 340 transfers the rotational force generated from the haptic rotary switch driver 310 to the haptic rotary switch knob 350 which will be described later. The haptic rotary switching power transfer unit 320, 330 and 340 includes a haptic rotary switch driving gear 320 and a haptic rotary switch knob gear 330. The haptic rotary switch driving gear 320 is rotatably disposed in a space between the housing body 120 and the housing base 130 in such a fashion as to be positioned on the top of the driver receiving portion 131. The haptic rotary switch driving gear 320 includes a driving gear mounting portion 321 and a driving main gear 323. The extension portion 313 and the driving shaft 311 formed on the haptic rotary switch driver 310 are insertedly disposed in the driving gear mounting portion 321. A space defined in the driving gear mounting portion 321 has a shape similar to that of an outer appearance of the extension portion 313 so as to completely transfer a rotational force generated from the haptic rotary switch driver 310. The driving main gear 323 is disposed on the top of the driving gear mounting portion 321. That is, the driving main gear 323 and the driving gear mounting portion 321 are formed integrally with each other so as to be rotated together. The driving main gear 323 is penetratingly disposed above the main printed circuit board 210 in such a fashion as to be positioned in a driver mounting portion 128 formed at the housing body 120. The driver mounting portion 128 has a structure in which a top end thereof is opened so as to allow the driving main gear 323 to be oriented toward the housing cover 110. The driving main gear 323 has a gear tooth formed on the outer circumferential surface thereof. The gear tooth of the driving main gear 323 is formed such that the number of teeth on the driving main gear 323 has a proper value according a preset gear ratio with respect to other gears.

According to the circumstances, the haptic rotary switch driving gear 320 may further include a drive sensing gear 325. That is, the driving gear mounting portion 321 may include a drive sensing gear 325 at one end thereof. The haptic rotary switch driving gear 320 may has a construction in which the drive sensing gear 325 is formed integrally with the driving main gear 323 so that the drive sensing gear 325 and the driving main gear 323 are rotated together each other so as to transfer the rotational force generated from the haptic rotary switch driver 310 to a rotary shaft 410 of the haptic rotary switch sensing unit which will be described later.

The haptic rotary switch knob gear 330 is rotatably disposed in the housing 100 in such a fashion as to mesh with the haptic rotary switch driving gear 320 so that it is rotated together with the haptic rotary switch knob 350 which will be described later. As shown in FIGS. 4 and 5, the haptic rotary switch knob gear 330 may have a gear meshing structure in which it has a knob gear tooth 331 formed on the outer circumferential surface thereof so as to mesh with the driving main gear 323 disposed on the top of the haptic rotary switch driving gear 320. Preferably, the gear ratio between the driving main gear 323 of the haptic rotary switch driving gear 320 and the knob gear tooth 331 has a gear ratio preset depending on the design specification. The haptic rotary switch knob gear 330 is stably mounted on a knob gear mounting portion 121 formed at the housing body 120 as a space defined between the housing body 120 and the housing cover 110. The haptic rotary switch knob gear 330 includes a knob mounting portion 335 formed on the top thereof. The knob mounting portion 335 is engaged with a knob mounting counterpart (not shown) formed on the underside of the haptic rotary switch knob 350 so as to allow the haptic rotary switch knob gear 330 and the haptic rotary switch knob 350 to be axially rotated together with each other. The haptic rotary switch knob gear 330 has a through-hole 333 formed in the center thereof, and the knob gear mounting portion 121 of the housing body 120 has an extension 123 protrudingly formed at the center thereof so that the extension 123 passes through the through-hole 333. The extension 123 is formed in a hollow shape so that the haptic enter switch unit 360 which will be described later can be insertedly disposed in a hollow space of the extension 123.

According to the circumstances, the knob gear mounting portion 121 of the housing body 120 may have a constituent element adapted to achieve a stable rotation of the haptic rotary switch knob gear 330. That is, the haptic rotary switching power transfer unit 320, 330 and 340 further includes a haptic rotary switch planetary gear 340 which is rotatably mounted at the knob gear mounting portion 121. As shown in FIGS. 4 and 5, the knob gear mounting portion 121 includes a planetary gear central shaft 125 upwardly extending toward the housing cover 110 so that the haptic rotary switch planetary gear 340 is rotatably mounted around the planetary gear central shaft 125. Also, the outer circumference of the haptic rotary switch driving gear 320, i.e., the driving main gear 323 abuts against that of the haptic rotary switch knob gear 330, i.e., the knob gear tooth 331. At this time, the outer circumference of the haptic rotary switch planetary gear 340 abuts against the inner circumference of the haptic rotary switch knob gear 330. That is, the haptic rotary switch knob gear 330 has a space defined within a lower portion thereof. The haptic rotary switch knob gear 330 has a gear tooth formed on the inner circumferential surface of the lower portion thereof so that the gear-toothed inner circumferential surface of the lower portion meshingly engages with the outer circumferential teeth of the haptic rotary switch planetary gear 340. The haptic rotary switching power transfer unit has a gear meshing structure in which the outer circumferential teeth of the haptic rotary switch planetary gear 340 meshes with the inner circumferential teeth of the haptic rotary switch knob gear 330 thereby preventing or reducing an erroneous operation, etc., due to a drive error caused by back lash or the like of the haptic rotary switch knob gear 330 and achieving stable rotation of the haptic rotary switch knob 350.

The haptic rotary switch knob 350 is exposed outside of the housing cover 110. As mentioned above, the haptic rotary switch knob gear 330 includes the knob mounting portion 335 formed on the top thereof so that the knob mounting portion 335 is engaged with the knob mounting counterpart (not shown) formed on the underside of the haptic rotary switch knob 350 so as to allow the haptic rotary switch knob gear 330 and the haptic rotary switch knob 350 to be axially rotated together with each other. The haptic rotary switch knob 350 includes a plurality of knob grips 351 formed on the top surface thereof. The knob grips 351 are formed in a salient shape so as to allow a user to feel a complete gripping sensation of the haptic rotary switch knob 350. The haptic rotary switch knob 350 has a through-hole 353 formed at the center thereof. The haptic rotary switch knob 350 may include a structure in which the haptic enter switch unit 360 is further disposed through the through-hole 353.

The haptic enter switch unit 360 includes a haptic enter switch knob 361, a haptic enter switch moving part 363 and a haptic enter switch 369. The haptic enter switch knob 361 is disposed in a haptic enter switch through-hole 353 formed in the haptic rotary switch knob 350 in such a fashion as to be movable relative to the haptic rotary switch knob 350. The haptic enter switch moving part 363 is movably mounted to a lower end of the haptic enter switch knob 361 in such a fashion as to pass through the haptic rotary switching power transfer unit. That is, the haptic enter switch moving part 363 is connected at one end thereof to the lower end of the haptic enter switch knob 361 and is disposed at other end thereof in a space defined between the housing body 120 and the housing base 130 through the extension 123 and the through-hole 333. The haptic enter switch moving part 363 has guides 365 formed on the outer circumference thereof. The guides 365 are engaged with guide counterparts (not shown) formed on the inner circumference of the extension 123 so as to guide movement of the haptic enter switch moving part 363. The haptic enter switch moving part 363 has a moving end 367 at one side thereof. The moving end 367 may be formed in a certain plate type in which an applied pressure can be transferred. In addition, in this embodiment, the moving end 367 has a structure in which it is formed integrally with the haptic enter switch moving part 363, but may include a structure in which it is independently formed of a separate elastic material. The moving end 367 may be constructed in various manners.

A haptic enter switch 369 is disposed at a position corresponding to the haptic enter switch moving part 361. The haptic enter switch 369 has a structure in which it includes a tact switch so as to be movable in response to movement of the haptic enter switch moving part 361. In this embodiment, although the haptic enter switch 369 is implemented as the tact switch, the haptic enter switch according to the present invention may be implemented as a non-contact type sensor, for example, a non-contact type magnetic sensor. The haptic enter switch moving part may be elastically mounted at the housing so as to be elastically moved by means of an elastic spring or the like. The haptic enter switch moving part may have a magnetic material formed at a lower end thereof so as to detect and switch a signal change due to a change in a magnetic field according to movement of the haptic enter switch moving part through the haptic enter switch implemented as the magnetic sensor. As mentioned above, various modifications to the haptic enter switch and the haptic enter switch moving part are possible.

In the meantime, the haptic steering wheel switch device 10 according to one embodiment of the present invention includes a haptic rotary switch sensing unit 400. The haptic rotary switch sensing unit 400 includes a rotary shaft 410, a haptic rotary switch sensor counterpart 420 and a haptic rotary switch sensor 430. The rotary shaft 410 of the haptic rotary switch sensing unit includes a body 411 and a gear 413. The body 411 is rotatably supported at one end by the housing base 130, and the rotary shaft gear 413 is formed by having a gear tooth formed on the outer circumferential surface of the other end of the body 411. The rotary shaft 410 of the haptic rotary switch sensing unit is rotatably disposed with it meshing with the haptic rotary switch driving gear 320. In this case, the haptic rotary switch driving gear 320 meshes with the gear 413. That is, as mentioned above, the haptic rotary switch driving gear 320 may have a construction in which it further includes a drive sensing gear 325. Alternatively, the haptic rotary switch driving gear 320 may have a construction in which the drive sensing gear 325 is formed integrally with the driving main gear 323 so as to rotate together with the driving main gear 323 so that the driving main gear 323 generated from the haptic rotary switch driver 310 is transferred through the gear 413 of the rotary shaft 410 of the haptic rotary switch sensing unit which will be described later. The drive sensing gear 325 meshes with the gear 413 of the rotary shaft 410 of the haptic rotary switch sensing unit so that it is rotated together with the haptic rotary switch knob gear 330 and the haptic rotary switch driving gear 320 in response to the rotation of the haptic rotary switch knob 350.

The haptic rotary switch sensor counterpart 420 is disposed at an upper end of the rotary shaft 410 of the haptic rotary switch sensing unit. In this embodiment, the haptic rotary switch sensor counterpart 420 is implemented as an encoder having a plurality of slits. The haptic rotary switch sensor counterpart 420 is rotated together with the rotary shaft 410 of the haptic rotary switch sensing unit.

A haptic rotary switch sensor 430 is disposed on the printed circuit board 200 so as to be placed at a position corresponding to the haptic rotary switch sensor counterpart. More specifically, the haptic rotary switch sensor 430 is disposed on the sensing printed circuit board 230. Thus, the haptic rotary switch sensor 430 transfers a change in an electrical signal generated in response to rotation of the haptic rotary switch sensor counterpart 420 to the controller (not shown).

FIG. 6 is a schematic partially transverse sectional plan view illustrating a power transfer and gear meshing structure of a haptic steering wheel switch device 10 according to one embodiment of the present invention. The haptic rotary switch knob 350 of the haptic steering wheel switch device 10 is connected to the haptic rotary switch knob gear 330, and the haptic rotary switch knob gear 330 has a knob gear tooth 331 formed on the outer circumferential surface thereof so that the haptic rotary switch knob gear 330 meshes with the driving main gear 323 through the knob gear tooth 331. The haptic rotary switch driving gear 320 including the driving main gear 323 is axially connected to the haptic rotary switch driver 310 so that a rotational force imparting a haptic sensation is applied to the haptic rotary switch knob 350 gripped by a user. The haptic rotary switch driving gear 320 includes a drive sensing gear 325 at a lower end thereof so that the drive sensing gear 325 meshes with the rotary shaft 410 of the haptic rotary switch sensing unit to transfer a rotational force to the haptic rotary switch knob 350. Ultimately, a change in an electrical signal according to a sensing signal change of the haptic rotary switch sensor 430 by rotation of the haptic rotary switch sensor counterpart 420 is transferred to the controller (not shown) so as to detect and control the rotation state of the haptic rotary switch unit 300. Such a power transfer structure has a preset gear ratio. In one example of this embodiment, the haptic rotary switch knob gear 330 has 80 gear teeth on the outer circumference thereof, and the driving main gear 323 has 16 gear teeth on the outer circumference thereof. The drive sensing gear 325 coaxially rotating with the driving main gear 323 has 56 gear teeth, and the gear 413 of the rotary shaft has 16 gear teeth. In addition, in this embodiment, the haptic rotary switch sensor counterpart 420 has 29 slits formed therein, and can provide a resolving power by which one rotation of the haptic rotary switch knob 350 is decomposed into a total of 2030 signals by enabling generation of 2030 signals through the relationship of 80/16×56/16×29×4 (quadrature clock converter) by converting a signal outputted from the haptic rotary switch sensor 430 using a quadrature clock converter (not shown). This is merely one example of this embodiment, and the resolving power according to the present invention is not limited thereto, but various variations are possible through various gear ratios and signal conversions depending on the design specification. In addition, although it has been described in this embodiment that the haptic rotary switch sensing unit 400 is implemented as a photo sensor, the haptic rotary switch sensing unit according to the present invention may include a structure in which it is implemented as a magnetic sensor and various modifications are possible.

FIG. 7 is a schematic top plan view illustrating a steering wheel mounted with a haptic steering wheel switch device 10-1 according to another embodiment of the present invention, FIG. 8 is a schematic perspective view illustrating a haptic steering wheel switch device 10-1 according to another embodiment of the present invention, FIG. 9 is a schematic perspective view illustrating the haptic steering wheel switch device 10-1 of FIG. 8 when viewed from another direction, FIG. 10 is a schematic exploded perspective view illustrating a haptic steering wheel switch device 10-1 according to another embodiment of the present invention, and FIG. 11 is a schematic partially assembled perspective view illustrating a haptic steering wheel switch device 10-1 according to another embodiment of the present invention. The haptic steering wheel switch device 10-1 according to another embodiment of the present invention includes a housing 100-1, a printed circuit board 200-1 and a haptic rotary switch unit 300-1. The printed circuit board 200-1 is disposed inside of the housing 100-1, and the haptic rotary switch unit 300-1 is disposed in the housing 100 so as to be rotated by a user.

As shown in FIG. 7, the housing 100-1 is mounted in a steering wheel 1-1 which includes a steering wheel body 3-1 and a steering wheel rim 2-1. Another switch device 20-1 may be provided at a position opposite to the haptic steering wheel switch device 10-1 of the steering wheel 1-1. The housing 100-1 is disposed at a side of the steering wheel body 3-1 of the steering wheel 1-1 in such a fashion as to be positioned between the steering wheel body 3-1 and the steering wheel rim 2-1. The housing 100-1 includes a cover 110-1, a body 120-1 and a base 130-1. The housing body 120-1 is disposed between the housing cover 110-1 and the housing base 130-1.

The housing cover 110-1 has a through-opening 111-1 formed on a side of the top surface thereof so as to allow haptic rotary switch knob 350-1, which will be described later, to be exposed externally therethrough. Also, in the case where the haptic steering wheel switch device 10-1 further includes a haptic button switch unit 500-1, the housing cover 110-1 may have a button switch knob through-opening 113-1 formed on the top surface thereof so as to allow the haptic button switch knob 510-1 of the haptic button switch unit 500-1 to be exposed externally therethrough. The housing cover 110-1 has cover-to-body engagement slots 112-1 formed on sides thereof and the housing body 120-1 has body-to-cover engagement pieces 122-1 formed on sides thereof to correspond to the cover-to-body engagement slots 112-1 so that the housing body 120-1 and the housing cover 110-1 is engaged with each other by means of the engagement between the cover-to-body engagement slots 112-1 and the body-to-cover engagement pieces 122-1.

The housing body 120-1 takes a construction for stable mounting or support of other constituent elements. The housing body 120-1 has an enter switch shaft through-passage 123-1 formed in a side thereof so as to allow a haptic enter switch shaft 363-1 of a haptic enter switch unit 360-1, which will be described later, to pass therethrough. The housing body 120-1 has body-to-base engagement slots 124-1 formed at the lower ends of sides thereof and the housing base 130-1 has base-to-body engagement pieces 134-1 formed on sides thereof to correspond to the body-to-base engagement slots 124-1. The body-to-base engagement slots 124-1 and the base-to-body engagement pieces 134-1 have a mutual engagement structure to enable the engagement between the housing body 120-1 and the housing base 130-1.

The housing base 130-1 includes a driver receiving portion 131-1 for therein accommodating a haptic rotary switch driver 310-1 which will be described later. The housing base 130-1 includes an enter switch mounting portion (not shown) defining a mounting space of the haptic enter switch unit 360-1 and a button switch mounting portion 137-1 defining a mounting space of the haptic button switch unit 500-1 in the proximity of the driver receiving portion 131. According to the circumstances, the housing 100-1 may includes a separate housing constituent element so as to partition the inner space thereof and facilitate the mounting of the haptic steering wheel switch device 10-1. That is, as shown in FIG. 10, the housing 100-1 may include a housing rear portion 140-1 and a housing side portion 150-1 so as to partition the inner space defined by the housing cover 110-1 and the housing base 130-1 or prevent a damage of the housing due to the contact between the housing and an external constituent element. The housing rear portion 140-1 and the housing side portion 150-1 may be formed of a soft material different from a material of the housing cover and the housing base, and may be constructed in various manners depending on the design specification.

The printed circuit board 200-1 is disposed inside of the housing 100-1. The printed circuit board 200-1 according to one embodiment of the present invention includes a main printed circuit board 210 and a button printed circuit board 220. The main printed circuit board 210-1 is disposed in the inner space of the housing defined by the housing body 120-1 and the housing base 130-1. A plurality of electrical elements and wiring circuits is disposed on the main printed circuit board 210-1. The main printed circuit board 210-1 has a driver through-opening 211-1 formed therein so that a haptic rotary switch driver 310 passes through the driver through-opening 211-1 so as to be oriented toward the inner space of the housing body 120-1. The main printed circuit board 210-1 includes a base through-hole 213-1 formed therein so as to allow a protrusion 133-1 extending upwardly from the housing base 130-1 passes therethrough. The button printed circuit board 220-1 and the main printed circuit board 210-1, which will be described later, establish electrical communication therebetween, and the main printed circuit board 210-1 is connected with a connector 240-1. The connector 240-1 is exposed to the outside through the housing 100-1 so that it is electrically connected with an external electrical connector (not shown) corresponding to the connector 240-1 so as to establish electrical communication between the haptic steering wheel switch device and the external device.

The button printed circuit board 220-1 is disposed between the housing cover 110-1 and the housing body 120-1 in such a fashion as to confront a button switch knob through-opening 113-1 formed in the housing cover 110-1. In this embodiment, a haptic rotary switch sensing unit is disposed on the main printed circuit board. According to the circumstances, the printed circuit board may take a construction in which it includes a separate printed circuit board for the haptic rotary switch sensing unit, and may be modified in various manners.

The haptic steering wheel switch device 10-1 according to another embodiment of the present invention includes a haptic rotary switch unit 300-1. The haptic rotary switch unit 300-1 includes a haptic rotary switch driver 310-1 and a haptic rotary switch knob 350-1. The haptic rotary switch driver 310-1 is disposed in the housing 100-1, i.e., the housing base 130-1 and generates a rotational force in response to an electrical signal. The housing base 130-1 includes the driver receiving portion 131-1 so that the haptic rotary switch driver 310-1 is received in the driver receiving portion 131-1. According to the circumstances, the housing base 130-1 may take a construction in which it further includes a protrusion or an accommodating groove formed on one side of the driver receiving portion 131-1 so as to stably support the haptic rotary switch driver 310-1.

The haptic rotary switch unit 300-1 according to this embodiment may include a driver accommodating cover 340-1. The driver accommodating cover 340-1 includes a body 341-1 and a pair of mounting ends 343-1. The body 341-1 of the driver accommodating cover defines an inner space together with the driver receiving portion 131-1 so as to accommodate the haptic rotary switch driver 310-1 in the defined inner space. The mounting end 343-1 of the driver accommodating cover is formed to correspond to a pair of mounting ends 132-1 formed in the housing base 130-1. The mounting ends 343-1 of the driver accommodating cover and the mounting ends 132-1 may include a structure in which they are engaged with each other or are fastened to each other through a separate fastening means such as a bolt. Such a fastening structure enables the haptic rotary switch driver 310-1 to achieve a stable mounting with respect to the housing 100-1. The body 341-1 of the driver accommodating cover 340-1 has a through-opening 345-1 formed on the top surface thereof so as to allow a driving shaft 311-1 of the haptic rotary switch driver to pass therethrough. The driving shaft 311-1 passes through the through-opening 345-1 so as to be oriented toward the haptic rotary switch knob 350-1. The haptic rotary switch driver 310-1 includes an electric motor or an electromagnetic brake. In this embodiment, the haptic rotary switch driver 310-1 is implemented as the electric motor. The haptic rotary switch driver 310-1 can perform a predetermined operation based on an electrical signal inputted through the connector 240-1. Preferably, the haptic rotary switch driver 310-1 is implemented as a motor enabling forward rotation, reverse rotation and the like which are realized by the electric motor.

The haptic rotary switch knob 350-1 is formed in a circular disc shape, but this is merely one example of this embodiment, and the shape and structure of the haptic rotary switch knob 350-1 is not limited thereto. The haptic rotary switch knob 350-1 is exposedly disposed on the top of the housing cover 110-1. The haptic rotary switch knob 350-1 includes knob mounting protrusions (not shown) formed on the underside thereof. The knob mounting protrusion has a projecting structure which is protrudingly formed toward the housing base 130-1. The haptic rotary switch knob 350-1 is disposed to pass through the through-opening 111-1 of the housing cover 110-1 so as to be oriented toward the housing base 130-1. The knob mounting protrusions (not shown) have a structure in which it is engaged with knob mounting protrusion counterparts 325-1 formed in a recessed structure on a haptic rotary transfer knob 320-1 which will be described later. The knob mounting protrusions have an engagement structure in which it is engaged with the knob mounting protrusion counterparts 325-1 so that the relative rotation movement between the knob mounting protrusions and the knob mounting protrusion counterparts 325-1, i.e., the haptic rotary switch knob and the haptic rotary transfer knob/the haptic rotary switch driver is prevented and the coaxial rotation between the haptic rotary switch knob and the haptic rotary switch driver is permitted. The haptic rotary switch knob 350-1 includes a plurality of knob grips 351-1. The haptic rotary switch knob 350-1 includes a plurality of knob grips 351-1 formed on the top surface thereof. The knob grips 351-1 are formed in a salient shape so as to allow a user to feel a complete gripping sensation of the haptic rotary switch knob 350-1. The haptic rotary switch knob 350-1 has a through-hole 353-1 formed at the center thereof. The haptic rotary switch unit may include a structure in which the haptic enter switch unit 360-1 may be further disposed through the through-hole 353-1.

The haptic rotary transfer unit 320, 330 and 420-1 is connected at one side to the haptic rotary switch knob 350-1, and is connected at the other side to the haptic rotary switch driver 310-1 so as to establish mechanical communication between the haptic rotary switch knob 350-1 and the haptic rotary switch driver 310-1. The haptic rotary transfer unit 360-1 includes a haptic rotary transfer knob 320-1 which is rotated together with the haptic rotary switch driver 310-1.

The haptic rotary transfer knob 320-1 includes a transfer knob body 321-1 which has the knob mounting protrusion counterparts 325-1 on the top surface thereof. As mentioned above, the knob mounting protrusion counterparts 325-1 has a structure in which it is engaged with the knob mounting protrusions (not shown) formed on the underside of the haptic rotary switch knob 350-1 so as to allow the haptic rotary switch knob 350-1 and the haptic rotary transfer knob 320-1 to be rotated together with each other. Here, although the present invention has a structure in which the knob mounting protrusions are disposed at the haptic rotary switch knob and the knob mounting protrusion counterparts are disposed at the haptic rotary transfer knob, it may include a structure in which the former and the latter are disposed at positions opposite to each other. Various constructions are possible depending on the design specification.

The haptic rotary transfer knob 320-1 is partially connected to the haptic rotary switch driver 310-1. To this end, the transfer knob body 321-1 of the haptic rotary transfer knob 320-1 has a through-opening 327-1 formed on the top surface thereof. The through-opening 327-1 of the haptic rotary transfer knob 320-1 is connected to the driving shaft 311-1 of the haptic rotary switch driver 310-1 so that the relative rotation between the through-opening 327-1 and the driving shaft 311-1 can be prevented. As shown in FIG. 10, the transfer knob body 321-1 of the haptic rotary transfer knob 320-1 further may have extensions 329-1 extending to both sides of the through-opening 327-1 so as to establish communication between the extensions 329-1 and the through-opening 327-1.

A transfer knob mounting portion 313-1 disposed at the driving shaft 311-1 of the haptic rotary switch driver 310-1. The transfer knob mounting portion 313-1 and the driving shaft 311-1 have a structure in which they are rotated together with each other without any relative rotation. That is, the transfer knob mounting portion 313-1 has a transfer knob mounting bore 315-1 which is configured to be fitted around the driving shaft 311-1. The transfer knob mounting portion 313-1 and the driving shaft 311-1 may have a polygonal mutual engagement structure, for example, a square structure, etc., in order to prevent the relative rotation between the transfer knob mounting portion 313-1 and the driving shaft 311-1, a press-fitting structure or the like. The transfer knob mounting portion 313-1 and the driving shaft 311-1 may have various structures within a range in which the relative rotation between the transfer knob mounting portion 313-1 and the driving shaft 311-1 is prevented.

The transfer knob mounting portion 313-1 has transfer knob mounting extensions 317-1 formed at the outer sides thereof. The transfer knob mounting extensions 317-1 according to the present invention are formed extending to both sides thereof. The transfer knob mounting extensions 317-1 may include a press-fitting structure in which the transfer knob mounting extensions 317-1 are fittingly engaged with the through-opening 327-1 and the extensions 329-1 without having any gap formed therebetween by having a shape in which they are engaged with the through-opening 327-1 and the extensions 329-1. Through such a structure, the rotational force generated from the haptic rotary switch driver 310-1 can be smoothly transferred to the haptic rotary switch knob 350-1 or the haptic rotary switch knob 350-1 can be rotated smoothly by a user.

The haptic rotary switch sensing unit 400 includes a haptic rotary switch sensor 410-1 and a haptic rotary switch sensor counterpart 430-1. The haptic rotary switch sensor 410-1 is disposed on the printed circuit board 200-1, more specifically, on the main printed circuit board 210-1 so as to establish electrical communication between the haptic rotary switch sensor 410-1 and the controller or an external electrical device through the main printed circuit board 210-1. The haptic rotary switch sensor counterpart 430-1 is disposed at a position corresponding to the haptic rotary switch sensor 410-1. The haptic rotary switch sensor counterpart 430-1 is disposed within the housing 100-1 so as to be rotated by receiving the rotational force from the haptic rotary switch driver 310-1. That is, the haptic rotary switch sensor counterpart 430-1, which has received the rotational force from the haptic rotary switch driver 310-1, is rotated within the housing 100-1 to cause the haptic rotary switch sensor 410-1 disposed at a position corresponding to the haptic rotary switch sensor counterpart 430-1 to generate a change in an electrical, magnetic or optical signal, which is in turn converted into a change in an electrical signal and is transferred to controller or the external electrical device through the main printed circuit board 210-1.

In this embodiment, the haptic rotary switch sensor counterpart 430-1 includes a shaft 433-1 and a body 431-1. The shaft 433-1 of the haptic rotary switch sensor counterpart is penetratingly disposed axially at the center of the body 431-1 of the haptic rotary switch sensor counterpart. The housing base 130-1 has the protrusion 133-1 extending upwardly toward the housing cover 110-1 from the inner bottom surface thereof. The protrusion 133-1 has a shaft mounting bore 135-1 formed at the center thereof. The shaft mounting bore 135-1 is opened at one end and is closed at the other end, and extends along a lengthwise direction of the protrusion 133-1. The protrusion 133-1 has a structure in which the shaft 433-1 of the haptic rotary switch sensor counterpart is inserted into the shaft mounting bore 135-1. This is merely one example of this embodiment, and the mounting structure of the shaft of haptic rotary switch sensor counterpart is not limited thereto.

The body 431-1 of the haptic rotary switch sensor counterpart has a structure which is hollow and open at the bottom end. The body 431-1 of the haptic rotary switch sensor counterpart has a plurality of slits 432-1 formed on a circumferential surface thereof, and a pair of haptic rotary switch sensors 410-1 are disposed to correspond to the position of the slits 432-1. That is, the haptic rotary switch sensors 410-1 are disposed to confront each other in such a fashion that the body 431-1 of the haptic rotary switch sensor counterpart, more specifically, the circumference formed with slits 432-1 of the body 431-1 is interposed between the haptic rotary switch sensors. The haptic rotary switch sensors 410-1 are composed of a transmitting part 411-1 and a receiving part 413-1. In this embodiment, the haptic rotary switch sensor counterpart includes the slits and the haptic rotary switch sensor is implemented as an optical sensor, but the present invention is not limited thereto. For example, the haptic rotary switch sensor counterpart may be composed of a magnet, and the haptic rotary switch sensor may be implemented as a magnetic sensor.

The haptic rotary transfer unit 320-1, 330-1 and 420-1 according to the present invention includes a haptic rotary transfer knob 320-1, a counterpart pulley 420-1 and a transfer belt 330-1 in order to transfer the rotational force from the haptic rotary switch driver to the haptic rotary switch sensor counterpart. A transfer knob pulley 323-1 is provided at a lower end of the transfer knob body 321-1 of the haptic rotary transfer knob 320-1. The transfer knob pulley 323-1 has a groove 324-1 formed on an outer circumferential surface thereof so that the transfer belt 330-1 is engaged at one side with the groove 324-1 of the transfer knob pulley 323-1. The top surface of counterpart pulley 420-1 is disposed at a predetermined position so as to be flush with the top surface of the transfer knob pulley 323-1. The counterpart pulley 420-1 is disposed at the haptic rotary switch sensor counterpart 430-1. That is, the counterpart pulley 420-1 is disposed at a top end of the body 431-1 of the haptic rotary switch sensor counterpart 430-1 or at a top end of the shaft 433-1 of the haptic rotary switch sensor counterpart. The transfer belt 330-1 is engaged at the other side with a groove formed on an outer circumferential surface of the counterpart pulley 420-1. Thus, the haptic rotary transfer knob 320-1, more specifically, the haptic rotary switch driver 310-1 and the haptic rotary switch knob 350-1 are engaged with the haptic rotary switch sensor counterpart by means of the transfer belt 330-1 so that the rotation of the haptic rotary switch driver 310-1 or the haptic rotary switch knob 350-1 can be detected by the haptic rotary switch sensing unit 400-1.

The haptic rotary switch knob 350-1 has a through-hole 353-1 formed at the center thereof. The haptic rotary switch knob 350-1ay have a structure in which the haptic enter switch unit 360-1 is further disposed through the through-hole 353-1.

The haptic enter switch unit 360-1 includes a haptic enter switch knob 361-1, a haptic enter switch moving part 363-1, a haptic enter switch mounting portion 370-1 and a haptic enter switch 380-1. The haptic enter switch knob 361-1 is disposed in the through-hole 353-1 formed at the haptic rotary switch knob 350-1 in such a fashion as to be movable relative to the haptic rotary switch knob 350-1. The haptic enter switch moving part 363-1 is movably mounted at the haptic enter switch knob 361-1 in such a fashion as to penetrate through the haptic rotary transfer knob 320-1. That is, the haptic enter switch moving part 363-1 is connected to both sides of the haptic enter switch knob 361-1, has a "⊓" shape, and is oriented at a lower end toward the housing base 130-1. The haptic rotary transfer knob 320-1 has through-holes 326-1. The through-holes 326-1 and the haptic enter switch moving part 363-1 are preferably disposed to be in parallel with each other for the purpose of stabgle movement of the haptic enter switch knob 361-1.

A ring-shaped haptic enter switch mounting portion 370-1 is disposed under the haptic rotary transfer knob 320-1. The haptic enter switch mounting portion 370-1 is engaged with the haptic enter switch moving part 363-1 so that the haptic enter switch knob 361-1 and the haptic enter switch moving part 363-1 can be prevented from being undesiredly separated from the haptic rotary transfer knob and escaping to the outside. That is, the haptic enter switch moving part 363-1 has indentations 365-1 formed at both lower ends thereof, and the haptic enter switch mounting portion 370-1 has protrusions 375-1 formed thereon. The haptic enter switch moving part 363-1 is disposed to be oriented toward the main printed circuit board 210-1 via the through-holes 326-1 of the haptic rotary transfer knob 320-1 so that the indentations 365-1 is engaged with the protrusions 375-1, thereby preventing the haptic enter switch knob 361-1 and the haptic enter switch moving part 363-1 from being undesiredly separated from the through-holes 326-1 and escaping to the outside.

The haptic enter switch 380-1 is disposed at a corresponding position of the haptic enter switch mounting portion 370-1 on one surface of the main printed circuit board 210-1. Here, the haptic enter switch 380-1 is implemented as an optical sensor including a transmitting part 381-1 and a receiving part 383-1. In the case where the haptic enter switch moving part 363-1, and ultimately the haptic enter switch mounting portion 370-1 is moved vertically against the main printed circuit board 210-1 by means of a pressure applied by a user, there occurs a change in a signal between the transmitting part 381-1 and the receiving part 383-1 which are implemented as optical sensors. Such a change in the sinal is converted into a change in an electrical signal, which is in turn transferred to the controller or the external electrical device so as to perform a predetermined enter switch operation mode.

Here, although it has been described that the haptic enter switch knob 361-1 and the haptic enter switch moving part 363-1 are separate constituent elements, they may have an integrally formed structure. The haptic enter switch unit 360-1 may include a structure in which the haptic enter switch moving part directly moves the haptic enter switch without having a separate haptic enter switch mounting portion. In addition, the haptic enter switch may be implemented as a tact switch, and various modifications thereof are possible depending on the design specification.

In the meantime, the haptic enter switch 360-1 may include a structure in which it returns to its original position after being operated so as to achieve a smooth operation of the haptic enter switch knob 361-1. That is, the haptic enter switch unit 360-1 may further include an elastic member 367-1 below the haptic enter switch knob 361-1. The elastic member 367-1 includes a support 368-1 and a movable part 369-1. The support 368-1 is formed at a lower end of the movable part 369-1 to enable a stable returning operation of the movable part 369-1. The movable part 369-1 is supported by the support 368-1, and can be pressed by the haptic enter switch knob 361-1 disposed thereon and can be moved vertically axially in response to a release of the pressure applied by the user. The elastic member 367-1 is preferably formed of a material having a certain elastic restoring force. Here, the elastic member is formed of an elastic material such as rubber, but may include a structure in which a constituent element such as an elastic coil spring is disposed. Thus, various modifications are possible.

When the haptic enter switch knob 361-1 is pressed by a user, the haptic enter switch moving part 363-1 connected to the haptic enter switch knob 361-1, it is moved downwardly toward the main printed circuit board 210-1 through the through-holes 326-1 formed in the haptic rotary transfer knob 320-1 by means of the pressure applied thereto. As mentioned above, the haptic enter switch knob 361-1 and the haptic enter switch moving part 363-1 are prevented from being undesiredly separated from the haptic rotary transfer knob 320-1 and escaping to the outside by means of the engagement between the protrusions 375-1 formed on the haptic enter switch mounting portion 370-1 and the indentations 365-1 formed on the haptic enter switch moving part 363-1. The haptic enter switch mounting portion 370-1 is also downwardly moved toward the main printed circuit board 210-1 through the downward movement of the haptic enter switch moving part 363-1 to cause the haptic enter switch 380-1 on the main printed circuit board 210-1 to be operated.

Now, the operation of the haptic steering wheel switch device 10-1 including the above-mentioned constituent elements will be described hereinafter. FIG. 12 is a schematic partially perspective vertical sectional view illustrating a haptic steering wheel switch device 10-1 according to another embodiment of the present invention. When a user rotates the haptic rotary switch knob 350-1 through manipulation, a rotational force provided by the user's manipulation is transferred to the haptic rotary transfer knob 320-1 of the haptic rotary transfer unit 320-1, and 330-1 and 420-1 from the haptic rotary switch knob 350-1. Then, the rotational force of the haptic rotary transfer knob 320-1 is transferred to the haptic rotary switch sensor counterpart 430-1 through the transfer knob pulley 323-1, the transfer belt 330-1 and the counterpart pulley 420-1 so as to rotate the haptic rotary switch sensor counterpart 430-1. The haptic rotary switch sensor 410-1 senses the amount of rotation in response to the rotation of the haptic rotary switch sensor counterpart 430-1 to generate a sensed signal which is in turn applied to the controller 60 (see FIG. 16) or the external electrical device.

The controller 60 (see FIG. 16) applies a control signal corresponding to an operating mode pre-stored in the storage unit 70-1 to the haptic rotary switch driver 310-1 based on this sensed signal to cause the haptic rotary switch driver 310-1 to provide a driving force for imparting a haptic sensation to the user according to a predetermined operating mode. The driving force is transferred to the haptic rotary switch knob 350-1 through the haptic rotary transfer unit 320-1 to allow the user to recognize a certain tactile sensation.

In this embodiment, there exists a diameter ratio of about 10:1 between the transfer knob pulley 323-1 and the counterpart pulley 420-1. Such a diameter ratio can also achieve a rotation ratio of about 10:1 between the transfer knob pulley 323-1 and the counterpart pulley 420-1. In addition, for example, 60 slits 432-1 are disposed at the body 431-1 disposed at the shaft 433-1 of the haptic rotary switch sensor counterpart at which the counterpart pulley 420-1 is mounted. Also, although not shown in this embodiment, a quadrature clock converter-1 is used among circuit elements disposed on the main printed circuit board 210-1 so as to convert the sensed signal outputted from the haptic rotary switch sensor 410-1 so that a total of approximately 2,400 signals can be produced through the relationship of about 10×60×4. As a result, it is possible to provide a resolving power by which one rotation of the haptic rotary switch knob 350 is decomposed into a total of approximately 2,400. However, this is merely one example of this embodiment and the resolving power according to the present invention is not limited thereto, but various constructions are possible through a variety of pulley diameter ratios (i.e., rotation ratios) and signal conversions implemented depending on the design specification. Further, although it has been described in this embodiment that the haptic rotary switch sensing unit 400 is implemented as a photo sensor, the haptic rotary switch sensing unit according to the present invention may include a structure in which it is implemented as a magnetic sensor and various modifications are possible.

For example, FIG. 13 is a schematic top plan view illustrating a steering wheel mounted with a haptic steering wheel switch device according to yet another embodiment of the present invention. When a user rotates the haptic rotary switch knob 350-1a through manipulation, a rotational force provided by the user's manipulation is transferred to the haptic rotary transfer knob 320-1 of the haptic rotary transfer unit 320-1, and 330-1 and 420-1a from the haptic rotary switch knob 350-1a. Then, the rotational force of the haptic rotary transfer knob 320-1 is transferred to the haptic rotary switch sensor counterpart 430-1a through the transfer knob pulley 323-1, the transfer belt 330-1 and the counterpart pulley 420-1a so as to rotate the haptic rotary switch sensor counterpart 430-1. The counterpart pulley 420-1a is rotatably supported on the main printed circuit board by a counterpart pulley support 421-1a. A haptic rotary switch sensor counterpart 430-1a is disposed at a lower end of the counterpart pulley 420-1a to be oriented toward the printed circuit board, and a haptic rotary switch sensor 410-1a is disposed at a position corresponding to the haptic rotary switch sensor counterpart 430-1a on one surface of the main printed circuit board. The haptic rotary switch sensor 410-1a is implemented as a magnetic sensor and the haptic rotary switch sensor counterpart 430-1a is implemented as a magnet. A change in a magnetic field occurs at the haptic rotary switch sensor counterpart 430-1a connected to the counterpart pulley 420-1a rotating by means of the rotational force transferred through the transfer belt 330-1 so that an electrical signal is changed due to the change in the magnetic field. As a result, the haptic rotary switch sensor 410-1a can generate a signal indicative of the electrical signal change for application to the controller 60 or the external electrical device which will be described later. Like this, various constructions are possible.

In addition, the haptic steering wheel switch device 10-1ashown in FIG. 13 may include a haptic rotary switch knob a 350-1aas another modified element. In the aforementioned embodiment, the haptic rotary switch knob 350-1 is implemented in a single injection-molded shape, whereas the haptic rotary switch knob 350-1a may have a dual injection-molded structure. That is, as shown in FIGS. 13 and 14, the haptic rotary switch knob 350-1a includes a haptic rotary switch knob base 350-1b formed of a high-hardness material such as polycarbonate (PC), polyethylene (PE) or the like, and a haptic rotary switch knob grip 350-1c formed of a thermoplastic elastomer (TPE) or the like. Each of haptic rotary switch knob base 350-1b and the haptic rotary switch knob grip 350-1c can be formed as a dual injection-molded structure. In particular, the thermoplastic elastomer exhibits excellent gripping sensation, high elasticity, superior low-temperature flexibility and high thermal stability. Also, the thermoplastic elastomer has an intermediate value of thermosetting plastic and rubber in terms of the modulus of elasticity and hardness. That is, the elastomeric haptic rotary switch knob grip 350-1c is injection-molded onto at least one surface of the high-hardness haptic rotary switch knob base 350-1b to achieve a structure in which a gripping sensation can be greatly improved owing to high moldability so that a rapid injection-mold production can be performed without any complicated process such as insertion and mounting of a separate elastic member. In FIG. 14, the haptic rotary switch knob grip 350-1c takes a cross type salient structure, but may take a structure in which it has a plurality of protrusions formed thereon according to the circumstances. By virtue of excellent high-temperature moldability, a desired design structure can be easily implemented.

Moreover, the haptic steering wheel switch device 10-1ashown in FIG. 13 may further include a constituent element for further improving a manipulation sensation by a user. That is, as shown in FIG. 13, the transfer knob pulley 323-1 is provided at al lower end of the transfer knob body 321-1 of the haptic rotary transfer knob 320-1. A ring-shaped transfer knob weight 600-1 is further provided on one surface of the transfer knob pulley 323-1 and an outer circumferential surface of the transfer knob body 321-1. The transfer knob weight 600-1 is implemented as a predetermined mass body. The rotational movement of the haptic rotary switch knob 350-1 can produce a certain inertia by the transfer knob weight 600-1's own weight so as to prevent generation of a noise through the haptic rotary switch sensor counterpart 430-1a and the haptic rotary switch sensor 410-1a due to rotation of the haptic rotary switch knob 350-1, i.e., frequent rotation of the counterpart pulley 420-1a by fine vibration. Also, the weight of the transfer knob weight 600-1 can provide a user with a given weight sensation.

In the meantime, although it has been described in the above embodiments that the haptic steering wheel switch device 10 and 10-1 is implemented as a rotary type haptic switch structure, the haptic steering wheel switch device 10 and 10-1 may include a structure in which it further includes another switch. Now, a description will be made with reference to the haptic steering wheel switch device denoted by reference numeral 10-1. As shown in FIGS. 10 and 11, the haptic button switch unit 500-1 is disposed at a button switch mounting portion 127-1 formed in the housing body 120-1 through the button switch knob through-opening 113-1 formed on the housing cover 110-1. The button printed circuit board 220-1 is disposed at the button switch mounting portion 127-1. The haptic button switch unit 500-1 includes a button switch knob 510-1, a button switch plunger 520-1 and a button switch 530-1. The button switch 530-1 is disposed on the button printed circuit board 220-1. The button switch knob 510-1 is pressingly and movably disposed on the housing cover 110. The button switch plunger 520-1 is a typical switch plunger which serves as a reciprocating element which enables depression of the button switch knob 510-1 or release of the depression allowing the button switch knob to return to its original position. The button switch plunger 520-1 is operated by means of the depression of the button switch knob 510-1 to cause the button switch 530-1 to be operated.

The haptic steering wheel switch device 10 according to the above embodiment includes a structure in which it is provided in a single number at one side of the steering wheel 1, but the haptic steering wheel switch device 10-1 according to the present invention, as shown in FIG. 15, may includes a structure in which it is provided in plural numbers at both sides between the steering wheel body 3-1 and the steering wheel rim 2-1 of the steering wheel 1a-1.

In the meantime, the present invention may provide a haptic steering wheel switch system 30 including the haptic steering wheel switch device 10. That is, as shown in FIG. 16, the haptic steering wheel switch system 30 may include a haptic steering wheel switch device 10, a controller 60, a storage unit 70 and an operating unit 80. Since the haptic steering wheel switch device 10 have been described in the above-mentioned embodiment, the detailed description thereof will be omitted to avoid redundancy. The haptic steering wheel switch device 10 establishes electrical communication with the controller 60. a signal detected by the haptic rotary switch sensing unit of the haptic steering wheel switch device 10 is transferred to the controller 60 which in turn applies a certain control signal to the haptic rotary switch driver 310. The controller 60 also establishes electrical communication with the storage unit 70. The storage unit 70 stores an preset operating mode corresponding to an electrical signal, i.e., a sensed signal outputted from the haptic steering wheel switch device 10, for example, an operating mode in which driving rotation direction, driving time or the like of the haptic rotary switch driver 310 is controlled in response to a control signal applied to the storage unit 70 from the controller 60 so as to impart a haptic sensation to the haptic rotary switch knob 350 (see FIG. 17) so that the storage unit 70 provides data relating to a predetermined operating mode to the controller in response to a control signal from the controller 160. As shown in FIG. 17, the haptic rotary switch driver 310 generates a rotational force (i.e., driving force, F) for producing a haptic sensation in response to the control signal from the controller 60. In this case, the generated rotational force (driving force) includes a variety of waveforms to perform the same function as that of a detent, including having a rotational force peak value at A, B, C and the like. The rotational force transferred to the haptic rotary switch knob 350 acts as a manipulation response force (P) so that when a user rotates the haptic rotary switch knob 350, the rotational force appears as a certain manipulation resistance so as to provide a haptic sensation allowing the user to bodily sense the manipulation resistance as a tactile detent sensation or a rotation resistance.

In addition, the controller 60 applies a predetermined control signal to the haptic steering wheel switch device 10, and simultaneously generates a predetermined control signal for an operating unit 80 as a to-be-controlled target corresponding to an operating mode selected by a user based on a signal inputted thereto from the haptic steering wheel switch device 10 to apply the generated predetermined control signal to the operating unit 80. The operating unit 80 includes a display unit 81, an acoustic output unit 83 and a ventilation unit 85. The display unit 81 displays an image for an operating mode to be selected by the haptic steering wheel switch device 10 or, a state of an operating mode selected by the haptic steering wheel switch device 10 in response to a control signal from the controller 60. For example, as shown in FIGS. 18 and 19, the display unit 81 is formed with a selection menu interface for operation of an inclination unit for a vehicle driver seat, the ventilation unit 85 which will be described, and the like. In the case where a user selects a predetermined menu, for example, a control mode for the ventilation unit 85 by turning the haptic rotary switch knob 350, a ventilation control mode screen as shown in FIG. 19 may be displayed as a graphic image which is a selection menu interface, i.e., a graphic user interface (GUI) on the display unit 81. The selection menu interface as the GUI is outputted as an image in association with the operation of the haptic steering wheel switch device 10 manipulated by the user. The GUI of the display unit has been described in connection with the inclination unit for a vehicle driver seat and the ventilation unit, but this is merely one example for illustrating the present invention and various selections are possible.

The acoustic output unit 83 can acoustically output a warning sound in response to a control signal from the controller 60. The operating unit may include a structure in which a control signal for forming a vehicle indoor temperature corresponding to a signal inputted from the haptic steering wheel switch device 10 is directly applied to the ventilation unit 85 or a ventilation unit controller (not shown) for performing the control of the ventilation unit 85, and various modifications are possible. Although it has been illustrated that the operating unit 80 includes the display unit 81, the acoustic output unit 83 and the ventilation unit 85, this is merely one example for illustrating the present invention and the operating unit may include a variety of units as to-be-controlled targets such as a navigation unit, etc.

Meanwhile, although mentioned briefly in the above-mentioned embodiments, the haptic steering wheel switch device and system is not limited these embodiments. For example, as shown in FIGS, 20 to 22, the haptic steering wheel switch device and system may take a structure in which it includes a directional switch unit. Another switch unit 20'-1 may be provided at a position corresponding to the haptic steering wheel switch device 10 of the steering wheel 1b-i. The other switch denoted by reference numeral 20'-1 may be implemented as a directional switch unit 20'-1.

The directional switch unit 20'-1 includes a directional switch housing 21-1, a directional switch knob 22-1 (22a-1 and 22b-1), a directional switch printed circuit board 24-1, and a plurality of directional switches 25a and 25b. The directional switch housing 21-1 includes a lower housing 21b-1 mounted at the steering wheel and an upper housing 21a-1. The lower housing 21b and the upper housing 21a-1 are coupled to each other to define an inner space therebetween so that the directional switch printed circuit board 24-1 is disposed in the inner space. The directional switch printed circuit board 24-1 may include a structure in which it establish electrical communication with the controller 60 through the connector, or with a vehicle controller through an external electrical device, for example, SRC and the like. Various constructions are possible.

The upper housing 21a-1 has an opening formed thereon so that the directional switch knob 22-1 is movably disposed on the directional switch housing 21-1 through the opening. The directional switch knob 22-1 includes a directional switch enter knob 22a-1 and a directional switch round knob 22b-1 which are elements separate from each other. The directional switch enter knob 22a-1 is disposed at the center of the directional switch round knob 22b-1. This configuration is merely one example of this embodiment, and the present invention is not limited thereto. The directional switch enter knob 22a-1 has an extension formed upwardly from an outer circumferential edge thereof, and the directional switch round knob 22b-1 has a knob stopper 22d-1 formed downwardly from an inner circumferential edge thereof. The knob stopper 22d-1 and the extension of the directional switch enter knob 22a-1 include a structure in which they are contactingly engaged with each other so as to prevent the directional switch enter knob 22a-1 from being undesiredly separated from the directional switch round knob 22b-1 and escaping to the outside. The directional switch round knob 22b-1 includes a round knob mounting portion 26a-1 at a lower end thereof, and the lower housing 21b-1 includes a round knob mounting counterpart 26b-1. The round knob mounting portion 26a-1 includes a structure in which it is brought partly into close contact with the round knob mounting counterpart 26b-1 so as to prevent the directional switch round knob 22b-1 from being undesiredly separated from the lower housing 21b-1 and escaping to the outside.

The directional switches 25a-1 and 25b-1 are disposed on one surface of the directional switch printed circuit board 24-1. In this embodiment, the directional switches 25a-1 and 25b-1 are implemented as push-type tact switches. The directional switches 25a-1 and 25b-1 includes a directional enter switch 25a-1 and a directional round switch 25b-1. A directional enter switch moving part 23a-1 and a directional round switch moving part 23b-1 are provided at the directional switch knob 22-1 to correspond to the directional switches 25a and 25b, respectively.

The directional switches 25a and 25b can generate and apply various combinations of signals capable of performing predetermined control operating modes selected by a driver through establishment of electrical communication between the directional switches and the controller 60 and/or the external electrical device as described above.

The above-mentioned embodiments are examples for illustrating the present invention, and the present invention is not limited thereto. For example, the haptic rotary switch sensing unit, the haptic enter switch and the like of the haptic steering wheel switch system according to the present invention may be implemented as a non-contact type switch including a non-contact type sensor. In addition, although it is has been illustrated in the above embodiments that the controller for controlling the haptic rotary switch unit of the haptic steering wheel switch device is disposed externally, the haptic steering wheel switch device may include a structure in which it is provided with a built-in dedicated controller according to the circumstances. The transfer knob weight may be disposed at the haptic rotary transfer knob as well as another constituent element performing a rotational operation. Various modifications are possible within a range of providing the haptic steering wheel switch device including the haptic rotary switch unit mounted at the steering wheel and the haptic steering wheel switch system.

INDUSTRIAL APPLICABILITY

The haptic steering wheel switch device and the haptic steering wheel switch system including the same according to the present invention may be implemented as vehicle switches and safety device which can provide a haptic sensation to allow a driver to have tactile recognition, thereby preventing his or her attention from being diverted during driving, and hence ensuring the safety driving. Also, the haptic steering wheel switch device and the haptic steering wheel switch system including the same according to the present invention may be disposed at a steering wheel for a vehicle as well as a center fascia, a dashboard or the like, and can be variously applied to technical fields requiring switch operation and sensory recognition such as an operation panel of a game machine according to the circumstances.

The invention claimed is:
1. A haptic steering wheel switch device comprising:
a housing mounted in a steering wheel;
a printed circuit board disposed inside of the housing; and
a haptic rotary switch unit including a haptic rotary switch driver disposed in the housing and adapted to generate a rotational force in response to an electrical signal, a haptic rotary switching power transfer unit adapted to transfer the rotational force generated from the haptic rotary switch driver, and a haptic rotary switch knob exposed outside of the housing and connected to the haptic rotary switching power transfer unit to receive the rotational force from the haptic rotary switching power transfer unit.

2. The haptic steering wheel switch device according to claim 1, wherein the haptic rotary switching power transfer unit comprises:
a haptic rotary switch driving gear connected to the haptic rotary switch driver; and
a haptic rotary switch knob gear rotatably disposed in the housing in such a fashion as to be meshed with the haptic rotary switch driving gear so as to be rotated together with the haptic rotary switch knob.

3. The haptic steering wheel switch device according to claim 2, wherein the haptic rotary switching power transfer unit further comprise a haptic rotary switch planetary gear rotatably mounted to the housing, and
wherein the outer circumference of the haptic rotary switch driving gear abuts against that of the haptic rotary switch knob gear in such a fashion that the outer circumference of the haptic rotary switch planetary gear partially abuts against the inner circumference of the haptic rotary switch knob gear.

4. The haptic steering wheel switch device according to claim 1, wherein the haptic rotary switch unit comprises a haptic enter switch unit,
wherein the haptic enter switch unit comprises:
a haptic enter switch knob movably disposed at the haptic rotary switch knob;
a haptic enter switch shaft disposed to penetrate through the haptic rotary switching power transfer unit and connected to the haptic enter switch knob; and
a haptic enter switch disposed on one surface of the printed circuit board and adapted to be movable by the haptic enter switch shaft.

5. The haptic steering wheel switch device according to claim 1, wherein the haptic rotary switching power transfer unit comprises a haptic rotary switch driving gear connected to the haptic rotary switch driver, and the haptic steering wheel switch device comprises a haptic rotary switch sensing unit, wherein the haptic rotary switch sensing unit comprises:
a rotary shaft rotatably disposed to mesh with the haptic rotary switch driving gear;
a haptic rotary switch sensor counterpart mounted on the rotary shaft of the haptic rotary switch sensing unit so as to be rotated together with the rotary shaft; and
a haptic rotary switch sensor disposed on the printed circuit board so as to be placed at a position corresponding to the haptic rotary switch sensor counterpart.

6. The haptic steering wheel switch device according to claim 1, further comprising a haptic button switch unit disposed in the housing.

7. The haptic steering wheel switch device according to claim 1, further comprising a directional switch unit, wherein the directional switch unit comprises:
a directional switch knob movably disposed at the steering wheel;
a directional switch printed circuit board disposed to correspond to the directional switch knob; and
a plurality of directional switches disposed on one surface of the directional switch printed circuit board to correspond to the directional switch knob, and adapted to be moved by means of the directional switch knob.

8. A haptic steering wheel switch system comprising:
a haptic steering wheel switch device, wherein the haptic steering wheel switch device comprises: a housing mounted in a steering wheel; a printed circuit board disposed inside of the housing; and a haptic rotary switch unit including a haptic rotary switch driver disposed in the housing and adapted to generate a rotational force in response to an electrical signal, a haptic rotary switching power transfer unit adapted to transfer the rotational force generated from the haptic rotary switch driver, and a haptic rotary switch knob exposed outside of the housing and connected to the haptic rotary switching power transfer unit to receive the rotational force from the haptic rotary switching power transfer unit;
a controller connected to the haptic steering wheel switch device so as to allow electrical communication to be established between the controller and the haptic steering wheel switch device, and adapted to output a control signal to the haptic steering wheel switch device;
a storage unit connected to the controller so as to allow electrical communication to be established between the storage unit and the controller, and adapted to store a preset operating mode corresponding to an electrical signal outputted from the haptic steering wheel switch device; and
an operating unit connected to the controller so as to allow electrical communication to be established between the operating unit and the controller, and adapted to be operated to correspond to an operating mode preset in response to an electrical signal outputted from the controller.

9. The haptic steering wheel switch system according to claim 8, wherein the operating unit further comprises a display unit or an acoustic output unit connected to the controller so as to allow electrical communication to be established between the display unit or the acoustic output unit and the controller, and adapted to be operated in response to the control signal generated from the controller.

10. A haptic steering wheel switch device comprising:
a housing mounted in a steering wheel;
a printed circuit board disposed inside of the housing; and
a haptic rotary switch unit including a haptic rotary switch driver disposed in the housing and adapted to generate a rotational force in response to an electrical signal, and a haptic rotary switch knob adapted to receive the rotational force generated from the haptic rotary switch driver;
a haptic rotary transfer unit connected at one side to the haptic rotary switch knob, and connected at the other side to the haptic rotary switch driver so as to interconnect the haptic rotary switch knob and the haptic rotary switch driver; and
a haptic rotary switch sensing unit including a haptic rotary switch sensor disposed on the printed circuit board, and a haptic rotary switch sensor counterpart rotatably disposed at a position corresponding to the haptic rotary switch sensor and adapted to receive the rotational force from the haptic rotary switch driver,
whereby the haptic rotary transfer unit is connected at one side to the haptic rotary switch driver and is connected at the other side to haptic rotary switch sensor counterpart so as to transfer the rotational force from the generated from the haptic rotary switch driver to the haptic rotary switch sensor counterpart.

11. The haptic steering wheel switch device according to claim 10, wherein the haptic rotary transfer unit comprises:
a haptic rotary transfer knob adapted to be rotated together with the haptic rotary switch driver, the haptic rotary transfer knob being connected to the haptic rotary switch driver and having a transfer knob pulley;
a counterpart pulley formed at one end of the haptic rotary switch sensor counterpart; and
a transfer belt engaged at both sides with the transfer knob pulley and the counterpart pulley, respectively.

12. The haptic steering wheel switch device according to claim 10, wherein the haptic rotary switch sensor counterpart comprises a plurality of slits formed on the circumferential surface thereof, and the haptic rotary switch sensor comprises an optical sensor.

13. The haptic steering wheel switch device according to claim 10, wherein the haptic rotary switch unit comprises a haptic enter switch unit,
wherein the haptic enter switch unit comprises:
a haptic enter switch knob movably disposed at one end at the haptic rotary switch knob in such a fashion as to be exposed to the outside and movably disposed at the other end at the haptic rotary transfer knob in such a fashion as to penetrate through the haptic rotary transfer knob; and
a haptic enter switch disposed at a position corresponding to the other end of the haptic enter switch knob on the printed circuit board so as to be operated by the other end of the haptic enter switch knob.

14. The haptic steering wheel switch device according to claim 10, further comprising a haptic button switch unit disposed in the housing.

15. The haptic steering wheel switch device according to claim 10, further comprising a directional switch unit, wherein the directional switch unit comprises:
a directional switch knob movably disposed at the steering wheel;
a directional switch printed circuit board disposed to correspond to the directional switch knob; and
a plurality of directional switches disposed on one surface of the directional switch printed circuit board to correspond to the directional switch knob, and adapted to be moved by means of the directional switch knob.

16. The haptic steering wheel switch device according to claim 10, wherein the haptic rotary switch knob includes a dual injection-molded structure.

17. The haptic steering wheel switch device according to claim 10, wherein the haptic rotary transfer unit further comprises a transfer knob weight disposed under the haptic rotary switch knob.

18. The haptic steering wheel switch device according to claim 10, wherein the haptic rotary switch sensor counterpart comprises a magnet, and haptic rotary switch sensor comprises a magnetic sensor disposed on the printed circuit board in such a fashion as to be spaced apart from the haptic rotary switch sensor counterpart.

19. A haptic steering wheel switch system comprising:
a haptic steering wheel switch device, wherein the haptic steering wheel switch device comprises: a housing mounted in a steering wheel; a printed circuit board disposed inside of the housing; and a haptic rotary switch unit including a haptic rotary switch driver disposed in the housing and adapted to generate a rotational force in response to an electrical signal, and a haptic rotary switch knob adapted to receive the rotational force generated from the haptic rotary switch driver; a haptic rotary transfer unit connected at one side to the haptic rotary switch knob, and connected at the other side to the haptic rotary switch driver so as to interconnect the haptic rotary switch knob and the haptic rotary switch driver; and a haptic rotary switch sensing unit including a haptic rotary switch sensor disposed on the printed circuit board, and a haptic rotary switch sensor counterpart rotatably disposed at a position corresponding to the haptic rotary switch sensor and adapted to receive the rotational force from the haptic rotary switch driver, whereby the haptic rotary transfer unit is connected at one side to the haptic rotary switch driver and is connected at the other side to haptic rotary switch sensor counterpart so as to transfer the rotational force from the generated from the haptic rotary switch driver to the haptic rotary switch sensor counterpart;

a controller connected to the haptic steering wheel switch device so as to allow electrical communication to be established between the controller and the haptic steering wheel switch device, and adapted to output a control signal to the haptic steering wheel switch device;

a storage unit connected to the controller so as to allow electrical communication to be established between the storage unit and the controller, and adapted to store a preset operating mode corresponding to an electrical signal outputted from the haptic steering wheel switch device; and an operating unit connected to the controller so as to allow electrical communication to be established between the operating unit and the controller, and adapted to be operated to correspond to an operating mode preset in response to an electrical signal outputted from the controller.

20. The haptic steering wheel switch system according to claim 19, wherein the operating unit further comprises a display unit or an acoustic output unit connected to the controller so as to allow electrical communication to be established between the display unit or the acoustic output unit and the controller, and adapted to be operated in response to the control signal generated from the controller.

21. A haptic steering wheel switch device comprising:
a housing mounted in a steering wheel;
a printed circuit board disposed inside of the housing; and
a haptic rotary switch unit including a haptic rotary switch driver disposed in the housing and adapted to generate a rotational force in response to an electrical signal, and a haptic rotary switch knob exposed outside of the housing and adapted to receive the rotational force generated from the haptic rotary switch driver.

* * * * *